US009273885B2

(12) United States Patent
Rodrigues et al.

(10) Patent No.: US 9,273,885 B2
(45) Date of Patent: Mar. 1, 2016

(54) ROOF INTEGRATED PHOTOVOLTAIC SYSTEM

(71) Applicant: Building Materials Investment Corporation, Dallas, TX (US)

(72) Inventors: Tommy F. Rodrigues, Nutley, NJ (US); Sudhir Railkar, Wayne, NJ (US); Daniel E. Boss, Parker, TX (US); David J. Gennrich, Fitchburg, WI (US); Cory Boudreau, Lake Elmo, MN (US); Daniel Roger Nett, Sun Prairie, WI (US); Kent J. Kallsen, Jefferson, WI (US); Luis Duque, Hackensack, NJ (US)

(73) Assignee: Building Materials Investment Corporation, Dallas, TX (US)

( * ) Notice: Subject to any disclaimer, the term of this patent is extended or adjusted under 35 U.S.C. 154(b) by 0 days.

(21) Appl. No.: 14/298,416

(22) Filed: Jun. 6, 2014

(65) Prior Publication Data

US 2014/0366464 A1    Dec. 18, 2014

Related U.S. Application Data

(60) Provisional application No. 61/834,527, filed on Jun. 13, 2013, provisional application No. 61/906,593, filed on Nov. 20, 2013.

(51) Int. Cl.
*E04D 13/18* (2014.01)
*H01L 31/05* (2014.01)
(Continued)

(52) U.S. Cl.
CPC .............. *F24J 2/5245* (2013.01); *F24J 2/5211* (2013.01); *F24J 2/5262* (2013.01); *H02S 20/25* (2014.12);
(Continued)

(58) Field of Classification Search
CPC ...... H01L 31/042; F24J 2/5211; F24J 2/5213; F24J 2/5215; F24J 2/465; F24J 2/4638; F24J 2/5245; F24J 2/5247; F24J 2/5252; F24J 2/5254; F24J 2/526; F24J 2/5262; H02S 20/23; H02S 20/25; H02S 40/32; H02S 40/34; H02S 40/36; Y02B 10/10; Y02B 10/12
USPC ......... 52/173.3, 536, 539, 542, 519; 126/622, 126/623
See application file for complete search history.

(56) References Cited

U.S. PATENT DOCUMENTS 4,336,413 A    6/1982  Tourneux
4,392,009 A *  7/1983  Napoli .......................... 136/251
(Continued)

*Primary Examiner* — Robert Canfield
(74) *Attorney, Agent, or Firm* — Womble Carlyle Sandridge & Rice LLP

(57) ABSTRACT

A roof integrated photovoltaic system includes a plurality of photovoltaic panels each having a right end, a left end, a front edge, and a back edge. A right end coupler is secured to the right ends of at least some of the photovoltaic panels and a left end coupler is secured to the left ends of at least some of the photovoltaic panels. The right end couplers and the left end couplers are configured to interlock and form a seal when two of the plurality of panels are moved into end-to-end engagement with each other. At least one front edge coupler is affixed to at least some of the plurality of photovoltaic panels at the front edges thereof and at least one back edge coupler is affixed to at least some of the plurality of photovoltaic panels at the back edges thereof. The front edge couplers and the back edge couplers configured to interlock when two of the plurality of panels are moved into edge-to-edge engagement and a seal is positioned to prevent water from penetrating at the junction of a front edge of one panel and the back edge of an adjoined panel. Panels are installed on a roof in end-to-end and front edge to back edge relationship to form a photovoltaic array and are electrically interconnected to produce electricity when exposed to sunlight. Flashing and gap filling faux panels are provided as part of the system.

16 Claims, 19 Drawing Sheets

(51) Int. Cl.
*F24J 2/52* (2006.01)
*H02S 40/32* (2014.01)
*H02S 20/25* (2014.01)
*H02S 40/36* (2014.01)
*F24J 2/00* (2014.01)

(52) U.S. Cl.
CPC ............... *H02S 40/32* (2014.12); *H02S 40/36* (2014.12); *F24J 2002/0061* (2013.01); *Y02E 10/47* (2013.01); *Y02E 10/50* (2013.01)

(56) References Cited

U.S. PATENT DOCUMENTS

| | | | |
|---|---|---|---|
| 4,433,200 A * | 2/1984 | Jester et al. | 136/251 |
| 4,582,953 A * | 4/1986 | Nagase et al. | 136/259 |
| 5,409,549 A | 4/1995 | Mori | |
| 5,651,837 A | 7/1997 | Ohtsuka et al. | |
| 5,951,785 A * | 9/1999 | Uchihashi et al. | 136/251 |
| 6,065,256 A | 5/2000 | Joko et al. | |
| 6,093,884 A | 7/2000 | Toyomura et al. | |
| 6,111,189 A * | 8/2000 | Garvison et al. | 136/244 |
| 6,242,685 B1 | 6/2001 | Mizukami et al. | |
| 6,311,137 B1 * | 10/2001 | Kurokami et al. | 702/60 |
| 6,370,828 B1 | 4/2002 | Genschorek | |
| 6,465,724 B1 * | 10/2002 | Garvison et al. | 136/244 |
| 6,838,611 B2 * | 1/2005 | Kondo et al. | 136/244 |
| 6,914,182 B2 | 7/2005 | Takeda et al. | |
| 6,928,775 B2 | 8/2005 | Banister | |
| 7,178,295 B2 | 2/2007 | Dinwoodie | |
| 7,297,867 B2 | 11/2007 | Nomura et al. | |
| 7,328,534 B2 * | 2/2008 | Dinwoodie | 52/173.3 |
| 7,342,171 B2 | 3/2008 | Khouri et al. | |
| 7,413,790 B2 * | 8/2008 | Hutter, III | 428/139 |
| 7,487,771 B1 * | 2/2009 | Eiffert et al. | 126/622 |
| 7,713,089 B2 * | 5/2010 | Faust et al. | 439/620.21 |
| 7,900,407 B2 | 3/2011 | Plaisted | |
| 7,956,279 B2 * | 6/2011 | Morita et al. | 136/251 |
| 8,104,239 B2 * | 1/2012 | Fath | 52/173.3 |
| 8,207,637 B2 * | 6/2012 | Marroquin et al. | 307/147 |
| 8,382,513 B2 * | 2/2013 | Kobayashi | 439/507 |
| 8,455,752 B2 * | 6/2013 | Korman et al. | 136/251 |
| 8,511,006 B2 * | 8/2013 | Reisdorf et al. | 52/173.3 |
| 8,813,460 B2 * | 8/2014 | Cinnamon et al. | 52/747.1 |
| 8,929,094 B2 * | 1/2015 | Marroquin et al. | 361/807 |
| 9,048,353 B2 * | 6/2015 | Casey et al. | |
| 9,065,354 B2 * | 6/2015 | Chapman et al. | |
| 9,076,899 B2 * | 7/2015 | Schrock | |
| 2003/0154667 A1 | 8/2003 | Dinwoodie | |
| 2004/0000334 A1 | 1/2004 | Ressler | |
| 2004/0031518 A1 | 2/2004 | Plantfeber | |
| 2004/0187909 A1 * | 9/2004 | Sato et al. | 136/251 |
| 2005/0241246 A1 | 11/2005 | Sinha et al. | |
| 2005/0257453 A1 * | 11/2005 | Cinnamon | 52/173.3 |
| 2006/0225780 A1 | 10/2006 | Johnson, III et al. | |
| 2007/0181174 A1 * | 8/2007 | Ressler | 136/251 |
| 2007/0199590 A1 | 8/2007 | Tanaka et al. | |
| 2007/0252716 A1 * | 11/2007 | Burger | 340/635 |
| 2007/0295393 A1 * | 12/2007 | Cinnamon | 136/251 |
| 2008/0190047 A1 * | 8/2008 | Allen | 52/173.3 |
| 2008/0302030 A1 * | 12/2008 | Stancel et al. | 52/173.3 |
| 2009/0133738 A1 | 5/2009 | Shiao et al. | |
| 2010/0170169 A1 | 7/2010 | Railkar et al. | |
| 2010/0236610 A1 | 9/2010 | Stancel et al. | |
| 2010/0313499 A1 * | 12/2010 | Gangemi | 52/173.3 |
| 2010/0313501 A1 * | 12/2010 | Gangemi | 52/173.3 |
| 2011/0154750 A1 * | 6/2011 | Welter et al. | 52/173.3 |
| 2011/0220180 A1 * | 9/2011 | Cinnamon et al. | 136/251 |
| 2011/0284058 A1 | 11/2011 | Cinnamon | |
| 2011/0314752 A1 * | 12/2011 | Meier | 52/173.3 |
| 2012/0079781 A1 | 4/2012 | Koller | |
| 2013/0125482 A1 * | 5/2013 | Kalkanoglu et al. | 52/173.3 |
| 2014/0102519 A1 * | 4/2014 | Rodrigues et al. | 136/251 |
| 2014/0166082 A1 * | 6/2014 | Langmaid et al. | 136/251 |
| 2014/0305050 A1 * | 10/2014 | Schulze et al. | 52/173.3 |
| 2015/0083197 A1 * | 3/2015 | Langmaid et al. | 136/251 |

* cited by examiner

ROOF INTEGRATED PHOTOVOLTAIC SYSTEM

REFERENCE TO RELATED APPLICATIONS

Priority is hereby claimed to the filing dates of U.S. provisional patent application 61/834,527 filed on Jun. 13, 2013 and provisional patent application 61/906,593 filed on Nov. 20, 2013.

TECHNICAL FIELD

This disclosure relates general to solar energy and more specifically to roof mounted solar panel arrays for generating electricity from sunlight.

BACKGROUND

Generating electricity from sunlight has been possible for many years through the use of photovoltaic (PV) cells and panels, PV panel assemblies have been mounted on the roofs of residential homes, but historically such installations have been considered by many to be unsightly and bulky. More recently, so-called "solar shingles" have been available, but these have not tended to be completely successful, particularly with respect to the difficulty of installation and performance issues related to shading or dirt accumulation on the PV panels of the shingles. A need exists for a PV system for the roof of a residential home that is not unsightly, that makes use of highly efficient solar cell technology, that includes shade management to maximize performance when some panels are shaded or dirty, that is integrated with the roof, and that, in addition to generating electricity, provides a roof deck covering that is at least as reliable and long lasting as traditional shingles. It is to the provision of a system that meets these and other needs that the present invention is primarily directed.

SUMMARY

The disclosure of U.S. provisional patent application 61/834,527 filed on Jun. 13, 2013 and the disclosure of U.S. provisional patent application 61/906,539 filed on Nov. 20, 2013 are hereby incorporated by reference in their entireties.

Briefly described, a roof integrated photovoltaic system comprises a plurality of PV panel assemblies that can be arranged in an array on a roof deck to produce electricity when exposed to sunlight. Each PV panel assembly has a rectangular solar panel, left and right end couplers, top edge couplers, and bottom edge couplers. A support rib may be disposed on the back of each PV panel assembly to provide support for the solar panel and form a cable tray to contain and guide electrical wiring and electrical connectors so that the wiring and connectors do not rest on the roof deck. Alternatively, a cable support may be formed without also serving to support the solar panel. To install an array, a worker first attaches a starter bar to the roof deck. Next, a lowermost course of PV panel assemblies is installed by sliding PV panel assemblies together end-to-end along the starter bar causing the end couplers to engage, lock, and seal together. Each PV panel assembly is fastened to the roof deck along its top edge and is electrically interconnected with previously installed panels with to aggregate the electrical output produced by the several panels thereby increasing the power rating of an array with each panel assembly that is installed.

With regard to electrical interconnection of the panels, each PV panel assembly preferably incorporates a micro-inverter that converts the direct current (DC) output naturally produced by the solar collectors of the panel when exposed to sunlight into an alternating current (AC) output. An AC output for each panel assembly provides numerous advantages including, for instance, its low voltage compared to traditional DC systems and consequent safer installation, its ready compatibility with the public electric grid, its readiness for immediate use to power electrical appliances, and the ability of the micro-inverters to be interconnected with simple parallel connections to increase the power capacity of an installation of PV panel assemblies. Other advantages of a micro-inverter associated with each panel assembly include the anti-islanding features of inverters insuring that installers are not connecting "live" wires during installation, the integrated shade management system of micro-inverters such that one shaded panel does not affect the output of all other panels connected to it, and the ability to track and monitor each PV panel assembly of an installed system, which is not possible with prior art DC systems. There is no need for an installer to worry about combined parallel and serial connections of panels to produce a desired voltage and current capacity. All electrical connections in the present invention are parallel. Microinverter termination also is much easier and straight forward because it follows the same wiring conventions as typical home electrical service and standard subpanels and breakers can be used. Finally, a PV system of the present invention is easily scalable simply by adding additional PV panel assemblies and perhaps a corresponding breaker in the subpanel. The aggregated AC output of the array can be coupled directly to the public electrical grid or otherwise used to power AC appliances within a home.

To form a next higher course of PV panel assemblies, a worker slides PV panel assemblies down the roof deck into engagement with the back edges of a previously installed course of panel assemblies. This causes the front edge couplers of the next higher course to engage and lock with the back edge couplers of the previously installed course of PV panel assemblies. At the same time, the front edge of the panel being installed overlaps the back edge of the previously installed panels and forms a seal to prevent water leakage between courses of panels during rainstorms. Thus, the panels of the array are sealed along both the vertical seams and their horizontal seams to prevent leakage onto the roof deck below. The PV panel assemblies of the next higher course are electrically interconnected together and to the course below so that each course of PV panel assemblies is aggregated to increase the power capacity of the array. Additional courses are added as described until a PV panel array of the desired size and power capacity is obtained.

As part of the installation of a PV array of the present invention, various flashing components are incorporated to flash the tops, sides, bottoms, and other areas of the array. These flashing components direct rainwater onto the top of the array and shed the water down and away from the array making an installed array double as a watertight roofing material in addition to producing electrical energy.

Thus, a roof integrated PV system is now provided that meets the above mentioned and other long felt needs in the industry. The system will be better appreciated and understood upon review of the detailed description set forth below taken in conjunction with the accompanying drawing figures, which are briefly described as follows.

DETAILED DESCRIPTION

Figure 1:
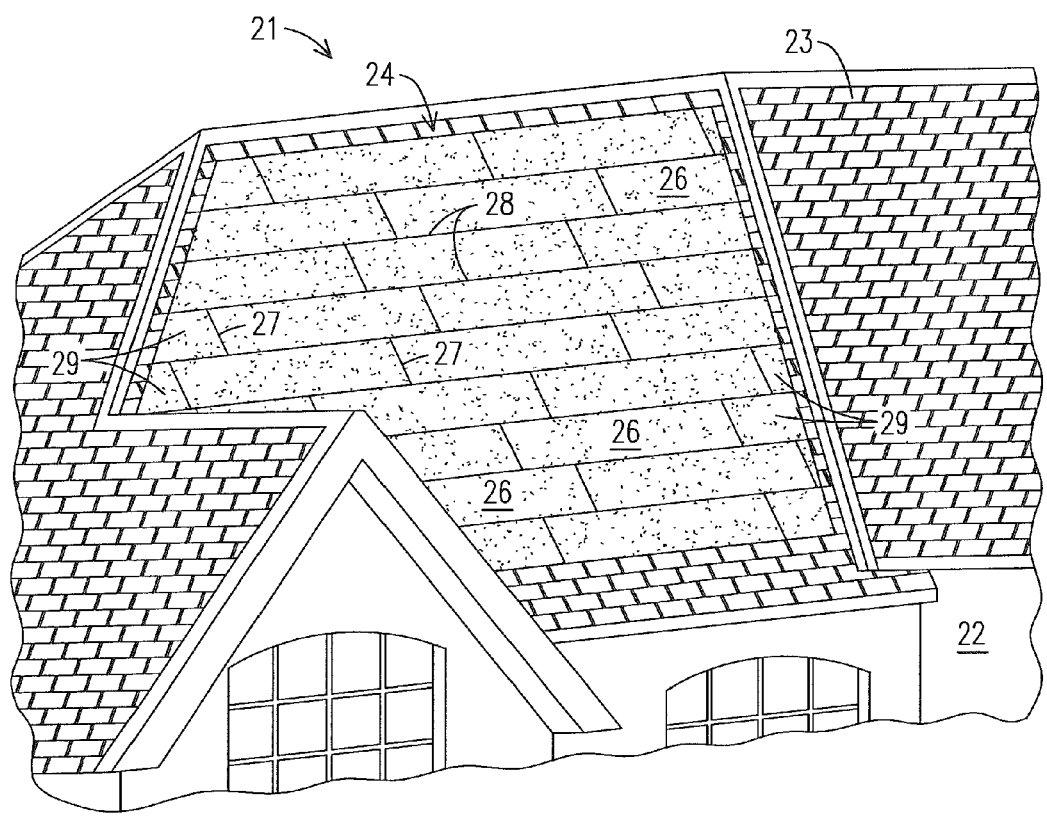
FIG. 1 is a perspective view of a residential home with a roof integrated PV system according to one aspect of this disclosure.

Referring now in more detail to the drawing figures, wherein like reference numerals indicate like parts throughout the several views, FIG. 1 illustrates a residential home 22 having a roof 23 with a roof integrated photovoltaic system 21 installed thereon according to one embodiment of the present invention. The roof integrated photovoltaic system 21 comprises a plurality of PV panel assemblies 26 mounted to the roof to form a PV array. The panels, when installed, define front-to-back edge connections 28 and end-to-end connections 27, which will be described in more detail below. Dummy panels 29 may be installed along the edges of the PV array to fill gaps along the edges of the array so that the array presents a neater appearance on the roof. The PV panel assembles may include corresponding micro-inverters that convert the original DC voltage produced by the solar cells of the PV panel assemblies to an AC voltage. The AC outputs of the micro-inverters of the PV panel assemblies are electrically connected together to result in an aggregated AC voltage and power rating of the array and this aggregated AC voltage may be electrically connected to the public electrical grid or otherwise used by a homeowner to power home appliances.

Figure 2:
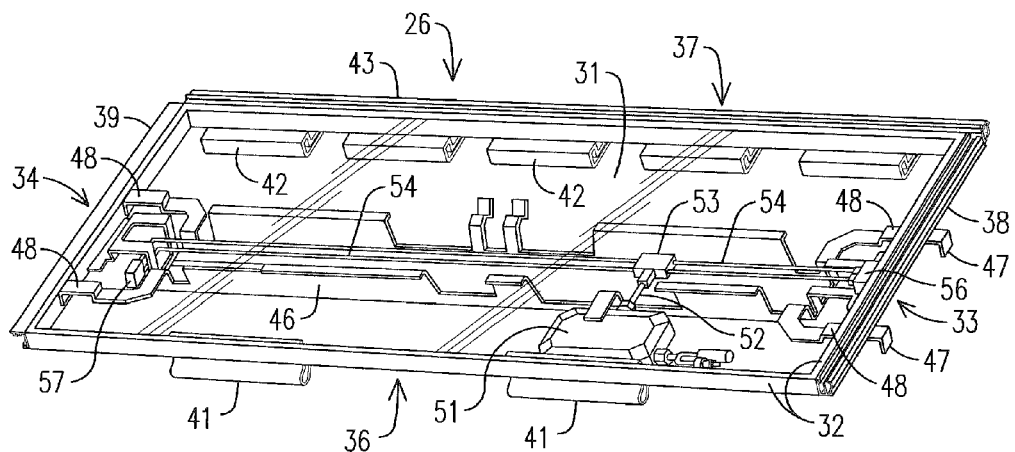
FIG. 2 is a perspective view of a PV panel assembly configured according to one aspect of the disclosure.
Figure 3:
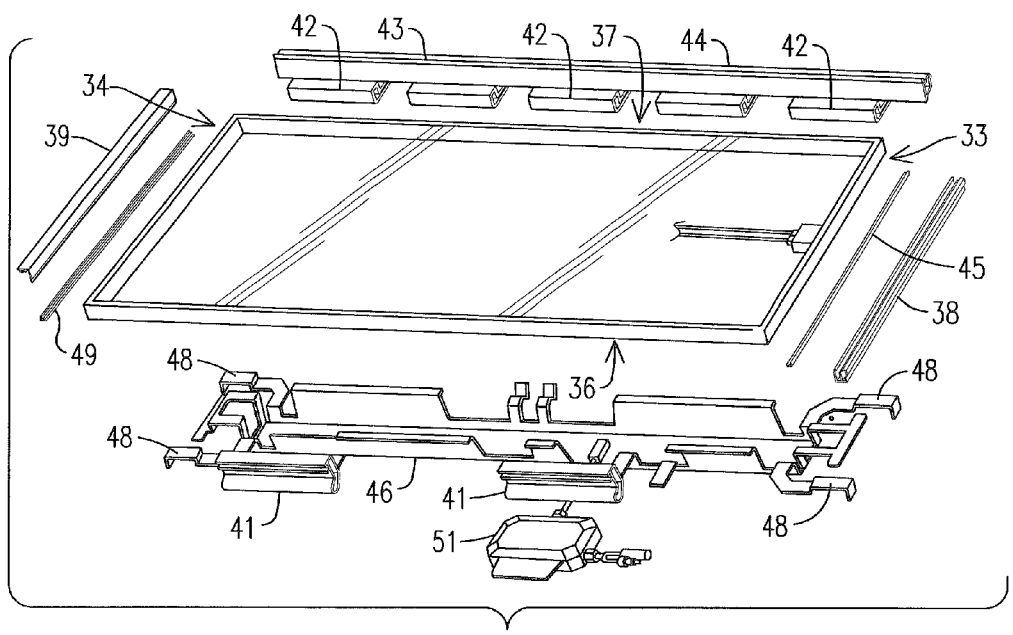
FIG. 3 is an exploded perspective view of the PV panel assembly of FIG. 2 illustrating various components of the PV panel assembly.

FIGS. 2 and 3 show one of the PV panel assemblies of this embodiment in its assembled configuration (FIG. 2) and in an exploded configuration (FIG. 3). In these figures, a solar panel comprises a field of solar cells 31 surrounded and supported by a frame 32, which may be an aluminum C-channel frame. Most of the field of solar cells is cut away in FIGS. 2 and 3 to reveal components of the system beneath the solar panel. In practice, the field of solar cells is dark and opaque and faces upwardly to be exposed to sunlight and thereby generate electricity. The solar panel in this embodiment is a commercially available product that may be obtained from a variety of sources such as, for example, TSMC Solar of San Jose, Calif. and STION of San Jose, Calif. The solar panel is generally rectangular in shape and has a right end 33, a left end 34, a front edge 36, and a back edge 37.

A right end coupler 38 is fixed to and extends along the right end 33 of the solar panel and a left end coupler 39 is fixed to and extends along the left end 34 of the solar panel. As detailed below, the right and left end couplers are configured to lock together and form a seal when two PV panel assemblies are urged together in an end-to-end relationship with each other. A gasket 45 (FIG. 3) is associated with the right end coupler 38 and a gasket 49 (FIG. 3) is associated with the left end coupler 39. As discussed below, the gaskets 45 and 49 are configured to form a seal against water penetration along an end-to-end connection of PV panel assemblies in a PV array.

Front edge couplers 41 are attached at the front edge 36 of the solar panel and project generally downwardly therefrom. In the illustrated embodiment, the front edge couplers do not extend along the full length of the front edge 36 but instead comprise two spaced apart couplers as shown. Back edge couplers 42 are attached at spaced intervals along the back edge of the solar panel and project generally downwardly therefrom. The front edge couplers 41 and the back edge couplers 42 are configured as detailed below to lock together when two PV panel assemblies are urged together in a front-edge-to-back-edge relationship. A seal strip 43 along the back edge of the solar panel carries an elongated gasket 44 (FIG. 3) that forms a seal against water penetration along a front-edge-to-back-edge connection of PV panel assemblies, as discussed in more detail below.

A micro-inverter 51 is mounted beneath the solar panel and its inputs are electrically connected to the DC output of the solar panel. The micro-inverter 51 converts the DC voltage produced by the solar panel to AC voltage at its plug 52. The AC voltage output of the micro-inverter is coupled through a splitter 53 to an electrical cable 54 that extends beneath and along the length of the solar panel. The electrical cable 54 terminates at the right end of the solar panel in a male electrical connector 56 and terminates at the left end of the solar panel in a female electrical connector 57. Of course, the locations of the male and female electrical connectors can be reversed or otherwise changed from that shown and described herein with the same or equivalent results.

In this embodiment, a support rib 46 is attached to the bottom of the solar panel and extends therealong from the right end 33 to the left end 34 of the solar panel. The support rib 46 extends downwardly from the solar panel a distance sufficient to rest on a roof deck below and thereby provide structural support to the solar panel when the PV panel assembly is installed on a roof. A cable tray is formed between spaced apart walls of the support rib 46 and is configured to enclose electrical cables of the PV panel assembly so that they do not rest directly on a roof deck below. The cable tray may have ends that define tabs 47. Further, the support rib 46 is formed with various clips 48 that function to clip the electrical connectors and cables of the system to the bottom of the solar panel, again preventing them from resting directly on a roof deck below. Retaining the cables and connectors above the roof deck is important because cables and connectors resting directly on the roof deck can become chafed over time and thereby represent an electrical hazard.

Figure 4A:
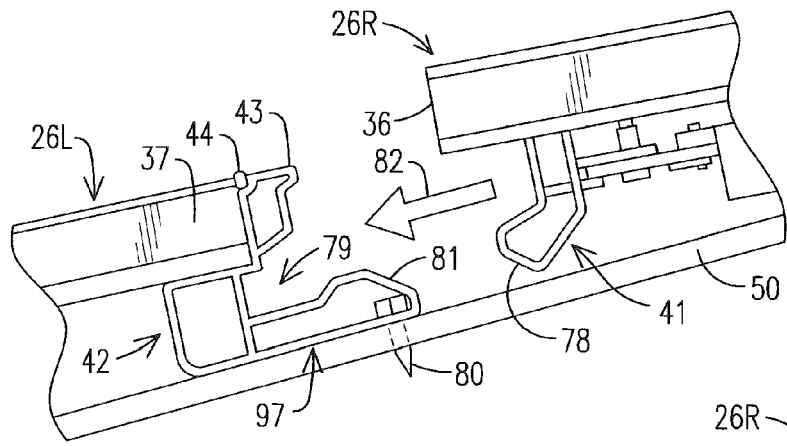
FIGS. 4A-4C illustrate one embodiment of front and back edge couplers and show sequentially the coupling together of the back edge couplers of one panel with the front edge couplers of a panel assembly in a next higher course of panel assemblies.
Figure 4B:
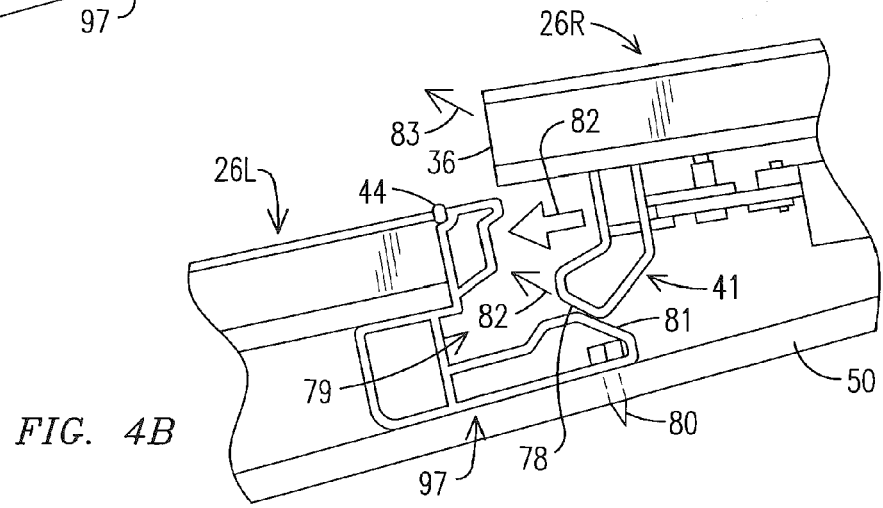
Figure 4C:
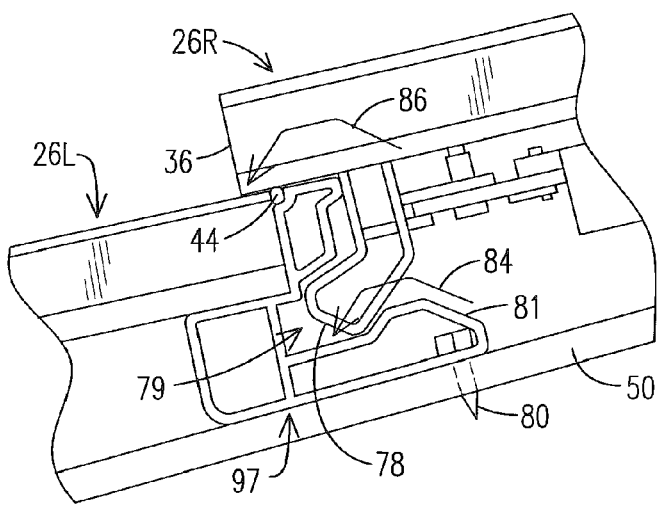

FIGS. 4A-4C illustrate in more detail one embodiment of the front edge and back edge couplers of the system and how they lock together when two PV panel assemblies are urged progressively together in a front-edge-to-back-edge relationship. The PV panel assembly on the left (26L) in these figures is a previously installed PV panel assembly of a lower course of PV panel assemblies and the PV panel assembly on the right (26R) is a PV panel assembly of a next higher course. PV panel assembly 26L has back edge 37 to which a set of back edge couplers 42 are fixed with rivets or other appropriate fasteners. The seal strip 43 extends along the back edge 37 of the PV panel assembly 26L and carries gasket 44, which may be a spaghetti gasket, a string gasket, or other appropriate compressible gasket.

The back edge coupler 42 define a rearwardly extending projection 97 that rests on a roof deck 50. The PV panel assembly is secured to the roof deck with screws or other appropriate fasteners 80 that extend through the back edge couplers and into the roof deck below. The rearwardly extending projection 97 further defines an inclined ramp 81 along its back edge and a slot 79 inboard of the ramp 81. PV panel assembly 26R has a front edge 36 and a set of front edge couplers 41 mounted just beneath and inboard of the front edge 36. Each front edge coupler is formed to define a forwardly facing tongue 78 sized to be received within the slot 79 of a back edge coupler 42.

FIG. 4A shows the PV panel assembly 26R being slid down the roof deck 50 in the direction of arrow 82 toward the back edge of the PV panel assembly 26L. In FIG. 4B, the PV panel assembly 26R has moved closer to the PV panel assembly 26L and the tongue 78 of the front edge coupler 41 has engaged the projection 97 of the back edge coupler 97. Further, the tongue 78 is seen riding up the ramp 81 of the back edge coupler in the direction indicated by arrow 82 as the PV panel assembly 26R is urged toward the PV panel assembly 26L. In this regard, the tongue 78 may be thought of as a ramp follower. This, in turn, causes the front edge of the solar panel of the assembly 26R to rise progressively upwardly as indicated by arrow 83. The front edge continues to rise until the bottom of the front edge is elevated slightly above the top of the back edge of PV panel assembly 26L when the tongue 78 reaches the top of the ramp 81.

FIG. 4C illustrates that as the tongue of the front edge coupler moves beyond the land at the top of the ramp 81, the tongue 78 falls downwardly into the slot 79 of the back edge coupler, where the tongue is captured. The downward motion of the tongue causes the front edge of the PV panel assembly 26R to move downwardly until its underside engages and compresses the gasket 44. The motion of the tongue and the front edge is illustrated by arrows 84 and 86 in FIG. 4C. This forms a seal against water leakage along the horizontal interface between the two PV panel assemblies. In addition, an overlap is formed between front edge of the PV panel assembly 26R and the back edge of the PV panel assembly 26L to define a water shed, which promotes cascading and further inhibits leakage of water during rain.

It will be seen from the forgoing that a course of PV panel assemblies can easily be installed above a previously installed course of PV panel assemblies by sliding the PV panel assemblies of the new course into front-edge-to-back-edge engagement with the panels of the previously installed course and urging them together. This causes the two panels to lock together and form a seal along their interface. The new panel can then be secured to the roof deck with a screw as shown at 80 in FIGS. 4A-4C in preparation for a next higher course of PV panel assemblies or back flashing. The locations along the back edge of the five back edge couplers 42 (FIG. 3) and the locations along the front edge of the two front edge couplers 41 facilitate staggered installation of PV panel assemblies from course to course. More specifically, the PV panel assemblies of a higher course can be shifted right or left during assembly relative to PV panel assemblies of a lower course until their front edge couplers align with different pairs of back edge couplers on the panels of the lower course. In this way, the seams between the panels of the higher course are shifted and do not align with those of the panels of the lower course, rather like traditional asphalt shingles.

Figure 5A:
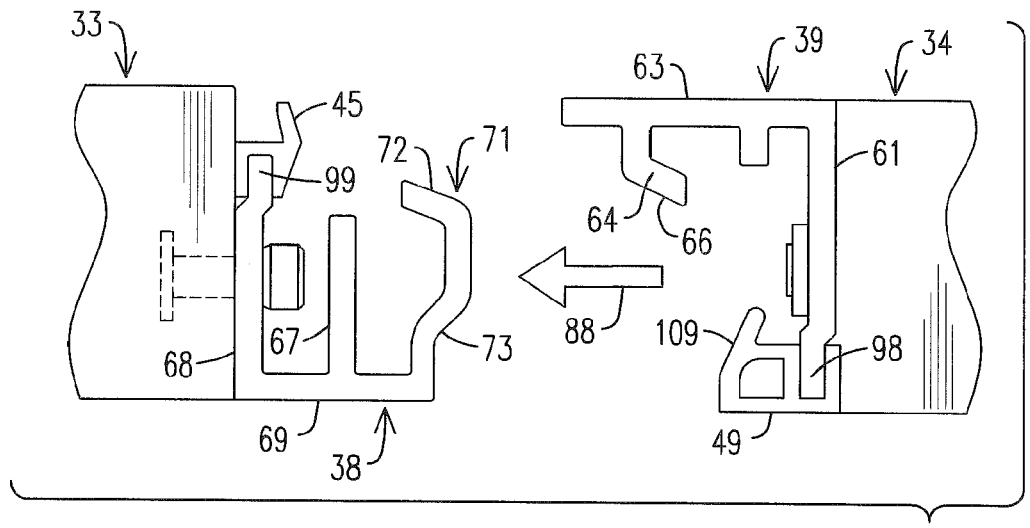
FIGS. 5A-5C illustrate one embodiment of left and right end couplers and show sequentially the coupling together of a left end coupler with a right end coupler during installation of PV panel assemblies in end-to-end relationships.
Figure 5B:
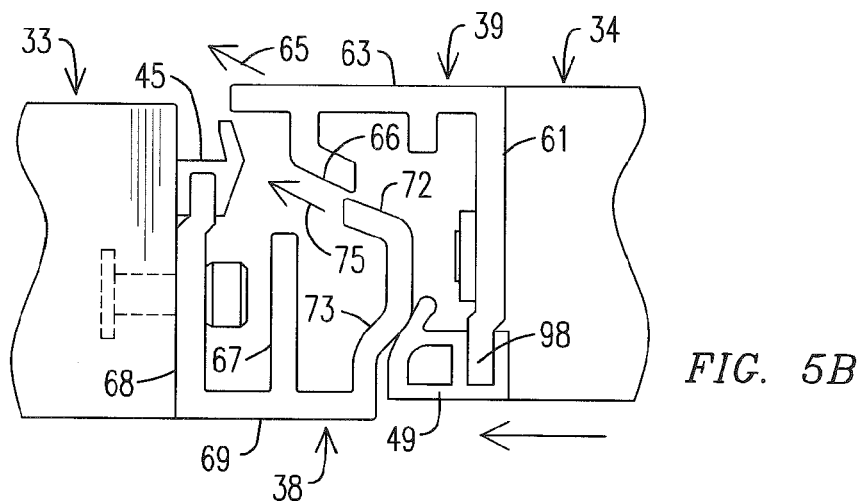
Figure 5C:
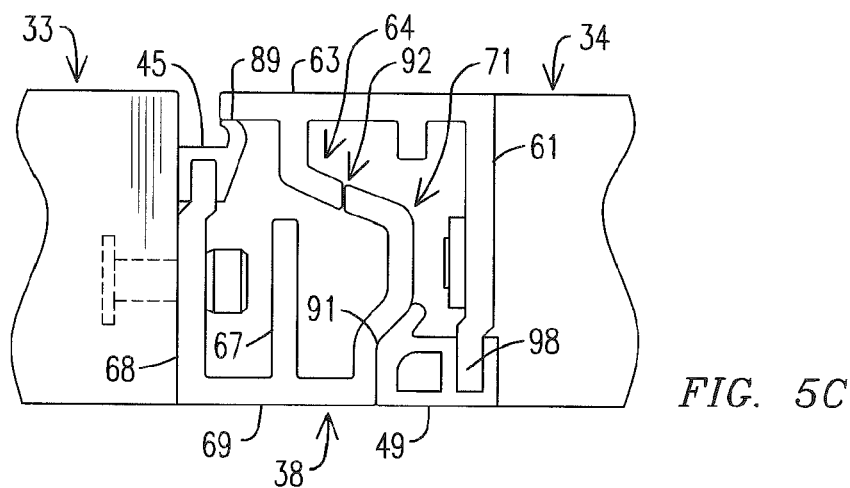

FIGS. 5A-5C illustrate the joining together of two (a first and a second) PV panel assemblies of this embodiment in a side-to-side relationship while installing a PV array according. In FIG. 5A, the right end 33 and left end 34 of two like PV panel assemblies are shown being moved toward one another as indicated by arrow 88. A right end coupler 38 is attached to the right end 33 with appropriate fasteners and extends along the right end 33 of the first PV panel assembly. Similarly, the left end coupler 39 is attached to the left end 34 with appropriate fasteners and extends along the left end 34 of the second PV panel assembly.

The right end coupler 38 is preferably formed of extruded aluminum or other appropriately rigid material and is profiled to define a vertical leg 68 that is fixed to the right end 33 of its solar panel and a horizontal leg 69 projecting from the bottom of the vertical leg 68. The top of the vertical leg 68 is slightly offset to define an elongated flange 99 that is sized to receive the gasket 45 associated with the right end coupler 38. The gasket in the preferred embodiment has an upstanding fin, but this gasket may take on a variety of different substitute shapes that obtain the same result. A wall projects upwardly from the end of the horizontal leg 69 and is formed to define a sealing surface 73 at its lower extremity and a locking tab 71 at its upper extremity. The locking tab 71 defines a ramped top surface 72. A structural rib 67 may be formed along the right end coupler if desired to improve its rigidity and strength.

The left end coupler 39 also is preferably formed of extruded aluminum and has a vertical leg 61 that attaches to the left end of the solar panel with rivets or other appropriate fasteners. The vertical leg 61 is offset along its bottom edge to define an elongated flange 98 sized to receive the gasket 49 associated with the left end coupler 39 and having an upwardly extending fin 109. A horizontal leg 63 projects from the top of the vertical leg 61 and is profiled with a locking tab 64 projecting downwardly from its underside. The locking tab 64 defines a ramped bottom surface 66. A structural rib also may be formed along the bottom side of the horizontal leg 63 to add rigidity and strength to the left end coupler. The gasket 49 is received onto and held in place by the flange 98 and, in the preferred embodiment, is formed with an upwardly projecting fin, although other gasket configurations are possible.

FIG. 5B shows the two PV panel assemblies being urged closer together in an end-to-end relationship. The ramped bottom surface 66 of the left end coupler has engaged the ramped top surface 72 of the right end coupler and is riding up the ramped surface 66 in the direction of arrow 75. In this regard, the ramped bottom surface 66 may be thought of as a ramp follower. This, in turn, causes the horizontal leg 63 of the left end coupler to move progressively upwardly in the direction of arrow 65, which generally elevates it above the gasket 45. Further, in FIG. 59, the left end coupler gasket 49 is seen just beginning to engage with the sealing surface 73 of the right end coupler.

Figure 6:
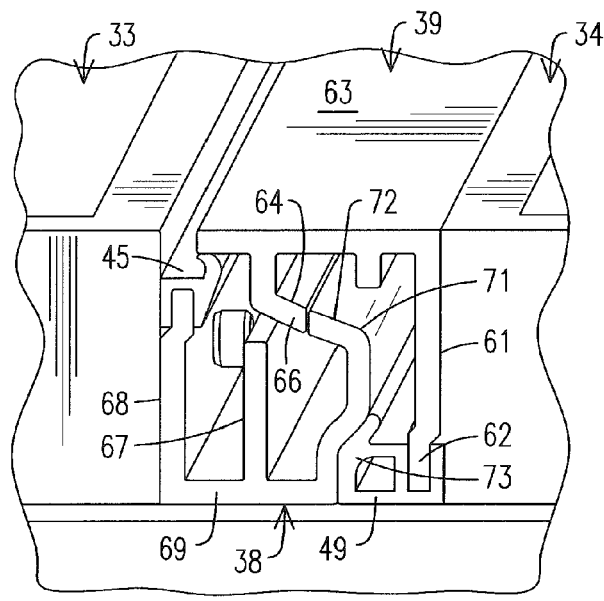
FIG. 6 is a perspective view showing left and right end couplers engaged and locked together and illustrates the sealing gaskets compressed within the locked together couplers.

In FIG. 5C, the two PV panel assemblies have been urged further toward one another such that the locking tab 64 of the left end coupler has moved just beyond the locking tab 71 of the right end coupler. At this point, the locking tab 64 of the left end coupler drops downwardly until its end is in a confronting relationship with the end of the locking tab 71 of the right end coupler, as shown at 92 in FIG. 5C. As this occurs, the left end coupler likewise drops down so that the fin 89 of the gasket 45 becomes compressed against the bottom of the vertical leg to form a seal against water penetration. At the same time, gasket 49 is compressed against the sealing surface 91 of the right end coupler to form a seal against water penetration along this interface. FIG. 6 is perspective view of two PV panel assemblies coupled together in an end-to-end relationship as just described and illustrates perhaps better the relationships of the various components of the couplers and their relationships to one another.

The sensation to an installer when installing PV panel assemblies end-to-end in a course is that when the end of one panel is urged into engagement with the end of an adjacent panel, a satisfying click-lock occurs. This tells the installer that a proper coupling together and sealing of the panels along their ends has been obtained. Each PV panel assembly is attached with screws to the roof deck as illustrated above when it has been properly installed in end-to-end relationship with a like PV panel assembly, thus progressively forming a course of PV panel assemblies.

When forming a course of PV panel assemblies above a previously installed course, an installer first slides an initial PV panel assembly down into a front-edge-to-back-edge engagement with panels of the previously installed course as described above. Preferably, but not necessarily, the initial panel is staggered relative panels in the previously installed course so that their end seams do not align. When the initial PV panel assembly is urged against the lower course, the installer again receives a satisfying click-lock confirmation that the couplers have fully engaged. This panel is then secured to the roof deck. The next PV panel assembly is slid down adjacent to the first and, once locked front-edge-to-back-edge with panels of the course below, is slid sideways into engagement with the just installed PV panel assembly. This locks the two panels both to the panels of the course below and in an end-to-end relationship with each other. Successive courses of PV panel assemblies are installed in this way until the PV array is complete.

Figure 7:
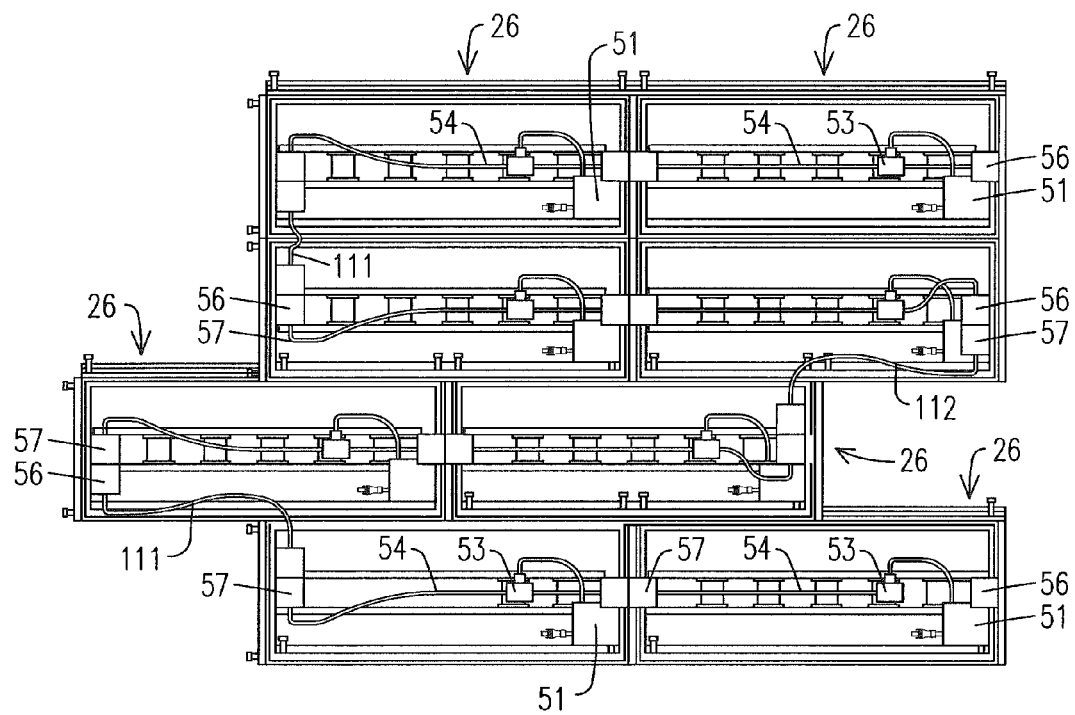
FIG. 7 is a top plan and partially transparent view of an array of PV panel assemblies according to one embodiment of the disclosure illustrating electrical connections between the micro inverters of the panels.

As the PV panel assemblies are installed the outputs of their micro-inverters are connected electrically to those of previously installed PV panel assemblies of the array. Some possible connections are illustrated in FIG. 7, where several PV panel assemblies 26 are shown in an array. As a step in the installation of a PV panel assembly in end-to-end relationship with a like PV panel assembly, the male elect al connector on the right end of one of the panel assemblies is connected to the female electrical connector on the left end of the other one of the panel assemblies. This connects the outputs of the micro-inverters of the two panel assemblies electrically in parallel. As the micro-inverter outputs of successive PV panel assemblies are added, the power rating of the installation is progressively increased.

For connecting the PV panel assemblies of one course to the PV panel assemblies of an adjacent course, one of two adapter cables may be used a male-to-male adapter cable 111 or a female-to-female adapter cable 112. Male-to-male adapter cables are cables with a male electrical connector on each end and, similarly, female-to-female adapter cables are cables with a female electrical connector on each end. As can be seen in FIG. 7, male-to-male adapter cables are used to connect courses of PV panel assembles together on the left side of an array of panels because the left end PV panel assemblies of each course has a female electrical connector 57. Conversely, female-to-female adapter cables are used to connect one course of PV panel assemblies to an adjacent course on the right side of the array, where the end panels of adjacent courses each have male electrical connectors 56. The PV panel assemblies are electrically connected sequentially as they are installed such that all electrical connections are completed at the end of the array installation and the full power rating of the array is established.

Figure 8:
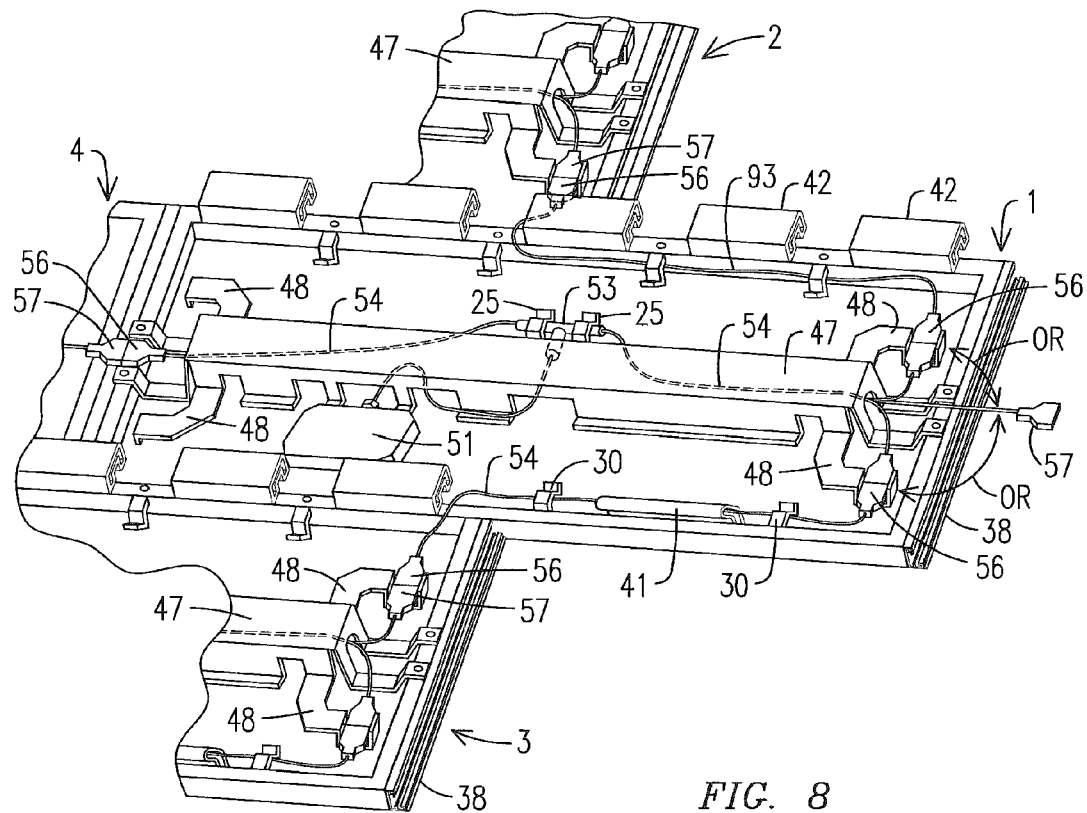
FIG. 8 is a bottom perspective view of a portion of the array of FIG. 7 illustrating the support rib of this embodiment and its various features for containing and restraining electrical cables and electrical connectors.

FIG. 8 illustrates perhaps better the cable management aspects of the PV panel assembly of this embodiment. Here, the underside of a portion of a PV array is illustrated and shows a first PV panel assembly 1, a second PV panel assembly 2, a third PV panel assembly 3, and a forth PV panel assembly 4 interconnected as described above. Micro-inverters 51 are attached to the bottoms of the PV panel assemblies and support ribs 47 span the lengths of the panels and also form cable trays beneath each panel. The AC output of each micro-inverter 51 is connected via a junction 53 to a power cable 54. The junction 53 is held in place to the bottom side of each assembly by clips 25 that are formed on the support rib 47. The power cable 54 extends within the cable tray from one end of each PV panel assembly to the other and terminates at one end in a male electrical connector 56 and at the other in a female electrical connector 57.

Each end of each power cable projects a sufficient distance from the ends of its PV panel assembly to allow two PV panel assemblies to be connected together electrically as they are installed on a roof deck in an end-to-end relationship. This is illustrated at the junction of PV panel assemblies 1 and 4 in FIG. 8. To connect the PV panel assemblies of one course of PV panel assemblies to those of an adjacent course, adapter cables are used as mentioned above. FIG. 8 illustrates two alternative connections of this type. To connect the course of PV panel assemblies in which PV panel assembly 1 resides to a next higher course in which PV panel assembly 2 resides, adapter cable 93 is used. Adapter cable 93 terminates at each of its ends in a male electrical connector 56 and these male connectors connect to the female electrical connectors 57 at the ends of PV panel assemblies 1 and 2. This connects the two courses of PV panel assemblies together electrically.

Alternatively, an adapter cable 94 can be used in the same way to connect PV panel assembly 3 of a next lower course of PV panel assemblies to the course of PV panel assemblies in which PV panel assembly 1 resides. The connections proceed in a sinuous manner from course to course at opposite edges of an installed array of PV panel assemblies so that the AC outputs of all of the PV panel assemblies of the array is aggregated to be directed to the public electrical grid or otherwise used. As illustrated in FIG. 8, the cable tray and its various clips 48, 53, etc. as well as clips such as clips 30 and 41 at the edges of the PV panel assembly retain the cables and the connectors beneath the PV panel assemblies and above a roof deck below. This prevents direct contact between the electrical components and the roof deck, which in turn prevents potential chafing and damage to these components.

Figure 9:
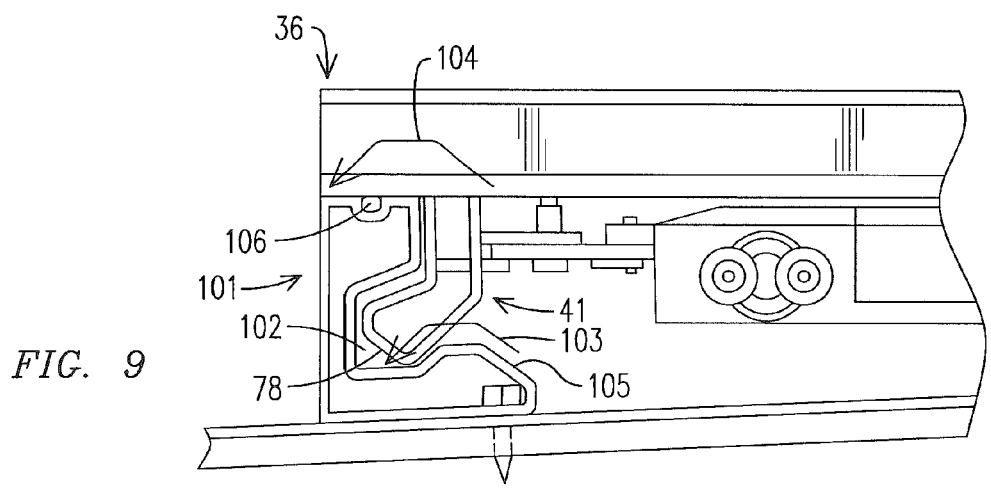
FIG. 9 is an edge view of the front edge portion of a lowermost course of a PV array illustrating use of a starter strip coupler for the lowermost installed course of PV panel assemblies.
Figure 10:
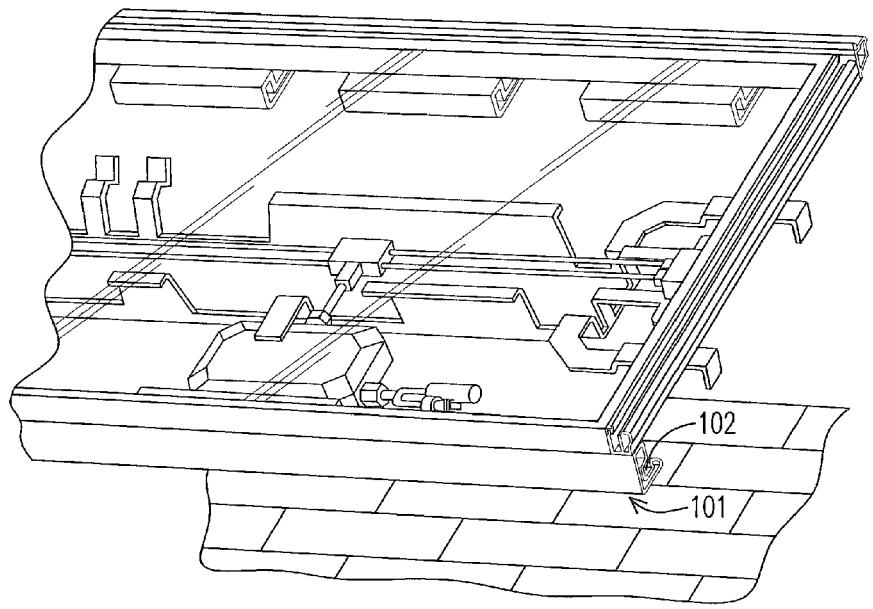
FIG. 10 is a perspective view of a PV panel assembly of the lowermost course showing its connection to the starter strip coupler along the front edge of the array.

When installing an array of PV panel assemblies in courses, an initial or lowermost course must be installed along a lower part of a roof deck first, to which higher courses are installed as detailed above. FIGS. 9 and 10 illustrate in side and perspective views respectively a preferred structure for installation of the lowermost course of PV panel assemblies. More specifically, a starter strip coupler 101 is first installed along the roof. The starter strip coupler 101 is configured on its upslope side to form a shape that is essentially the same as the shape of the projection 97 (FIG. 4B) of the back edge connectors 42. It defines a slot 102 sized to receive the tongue 78 of front edge couplers 41 of PV panel assemblies and a ramp 105. The front edge of the starter strip coupler 101 is simply flat rather than being configured for attachment to the back edge of a PV panel assembly. This forms an aesthetically pleasing nosing for the array of PV panel assemblies. A groove in an upper surface of the starter strip coupler carries a gasket 106.

As with front-edge-to-back-edge couplings of PV panel assemblies in adjacent courses, the lowermost course of PV panel assemblies is formed by sliding PV panel assemblies down the roof deck and urging them into engagement with the starter strip coupler 101. This causes the tongues 78 of the front edge couplers to move upwardly as they ride up the ramp 105 and then downwardly as the engage within the slot 102 of the starter strip coupler, as indicated by arrow 103. This, in turn, causes the front edge 36 of the PV panel assembly to move up and then down as indicated by arrow 104 in FIG. 9. As a result, the underside of the front edge of the PV panel assembly comes to rest on and compresses the gasket 106 forming a seal against water penetration along the front edge of the PV panel assembly.

Once a first PV panel assembly of the lowermost course in installed and attached to the roof deck via screws through its back edge couplers, a next adjacent PV panel assembly of the initial course can be installed. This is accomplished by sliding the next adjacent PV panel assembly downwardly to engage with the starter strip coupler 101 and then sliding the PV panel assembly sideways to urge its end into engagement with the end of the already installed PV panel assembly. This causes the ends of the PV panel assemblies to lock and seal as described above. Each PV panel assembly of the lowermost course is installed sequentially in this way until the lowermost course of PV panel assemblies is complete.

Figure 11:
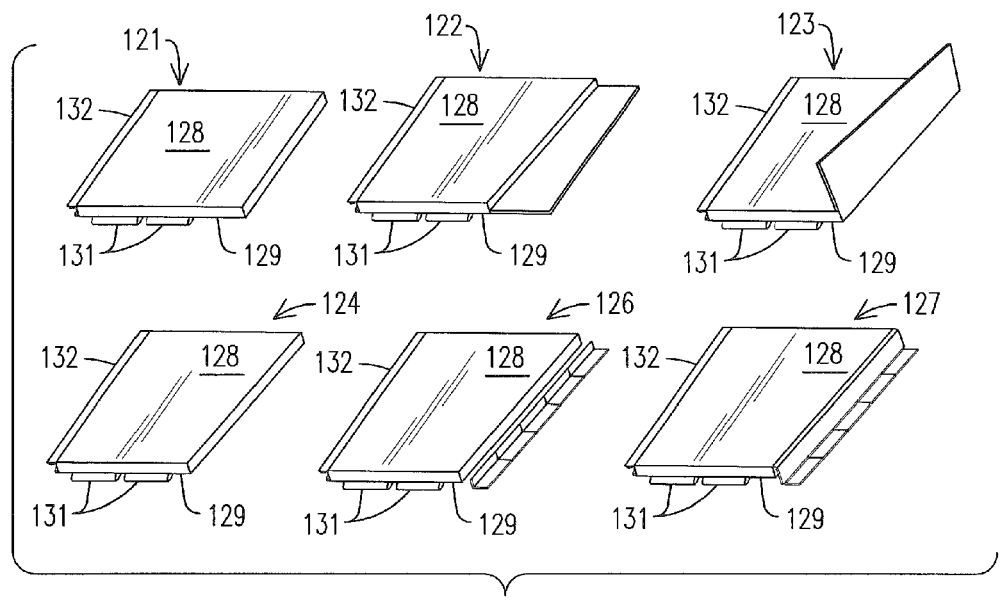
FIG. 11 illustrates several variations of dummy panels for filling gaps at the ends of an installed array of PV panel assemblies according to one embodiment of the disclosure.
Figure 12:
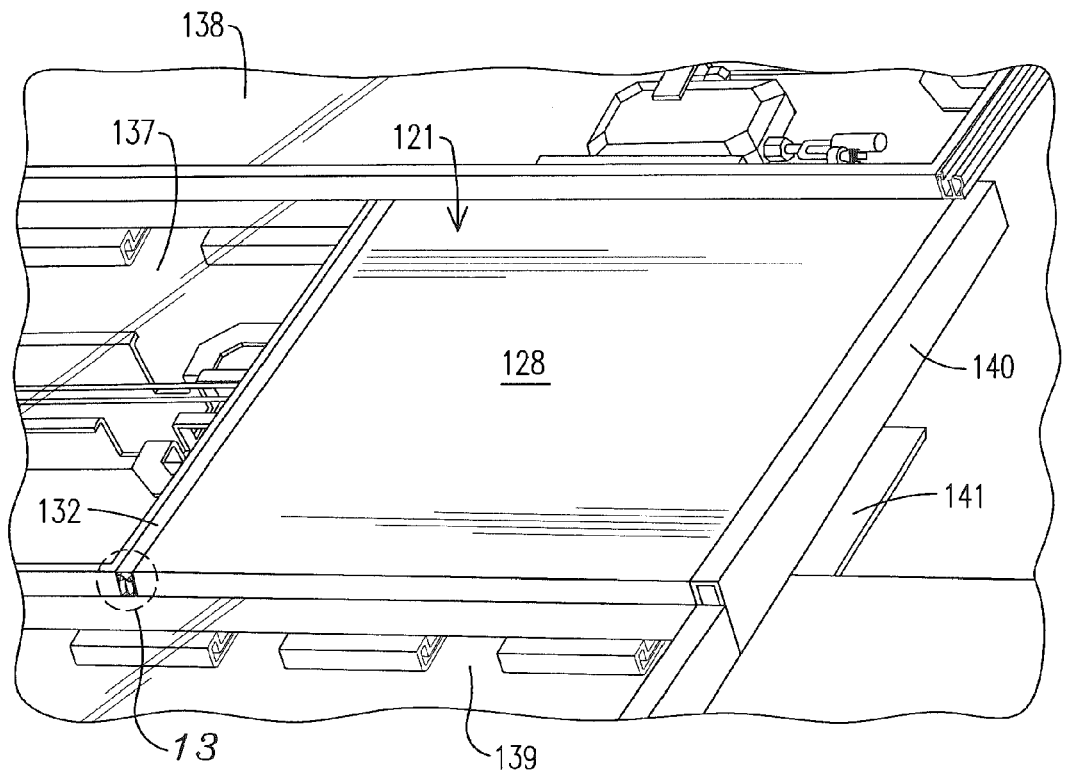
FIG. 12 is a perspective view of a section of the edge of an installed array of PV panel assemblies showing a dummy panel filling a gap formed by offset PV panel assemblies.
Figure 13:
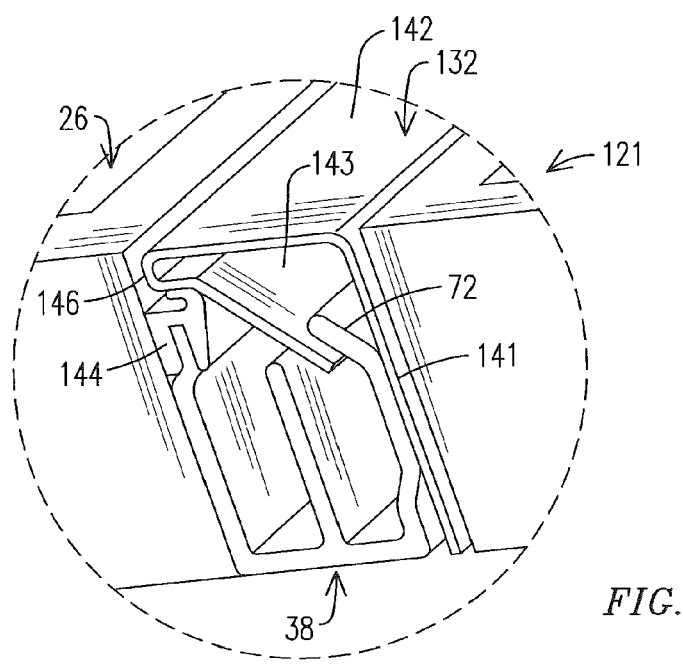
FIG. 13 is a perspective view illustrating connection of a dummy panel to the right end coupler of a PV panel assembly.

When installation of an array of PV panel assemblies is complete, the array likely will have left and right edges that are not straight and aligned and may instead define gaps. This is because the courses of the array may have offset panels at their ends and some courses may have fewer PV panel assemblies than others. In these instances, it may be desirable to fill the gaps along the edges of an installed PV array with dummy panels that do not produce electricity but are made to mimic the appearance of the PV panel assemblies of the array. For instance, dummy panels 29 in FIG. 1 are seen to fill irregularly shaped gaps along the left and right edges of a PV array atop a roof so that the edges of the completed installation are parallel or somewhat parallel with the edge contours of the roof. FIGS. 11-13 illustrate such dummy panels and how they may be coupled to the ends of PV panel assemblies to fill gaps along the edges of the array. Six variations of dummy panels 121, 122, 123, 124, 125, 126 and 127 are shown in FIG. 11. Each variation has an upper surface 128 that is fabricated to mimic the look of an active PV panel assembly. This upper surface may be formed of a variety of materials including, for example black PVC foam. Front edge couplers 131 are installed beneath the front edges 129 of the dummy panels just as they are for the active PV panel assemblies. Similarly, back edge couplers may be attached along the back edges of the dummy panels. In this way, dummy panels may be installed in an array in the same way that active PV panel assemblies are installed.

An end coupler 132 is attached along one end of each dummy panel. For example, in FIG. 11, the end couplers 132 are attached along the left ends of the dummy panels. In this way, the dummy panels can be coupled to a free right end of a PV panel assembly along the edge of a PV array. Variations of dummy panels with couplers along their right ends also are available for filling gaps along the left edge of an installed PV array on a roof. The right ends of the dummy panels in FIG. 11 may be provided with or configured to accept a variety of structures such as step flashing and counter flashing to provide flashing and/or water sealing. FIG. 12 shows a dummy panel 121 filling a gap along the right edge of an installed PV panel array. Its end coupler 132 is shown secured to the right end coupler of PV panel assembly 137 with its back edge being overlapped by solar panel 138 and its front edge overlapping PV panel assembly 139. It can be seen that the dummy panel 121 fills a gap along the edge of the installation and mimics the look of an active photovoltaic panel so that the edge installation appears straight and neat. Step flashing 139 interleaves with adjacent roofing shingles in the traditional manner and counter flashing 140 drapes over the step flashing. This provides a reliable barrier against migration of rainwater beneath the dummy panel and the array.

FIG. 13 shows one embodiment of a dummy panel left end coupler 132 and how it couples to a right end coupler 38 of an active PV panel assembly. The dummy panel end coupler 132 may be made of a resilient material such as extruded plastic or extruded or rolled aluminum and has a vertical leg 141 that attaches to and extends along the left end of a dummy panel 121. A horizontal leg 142 projects from the top of the vertical leg 141 and terminates in a rolled-under edge 146. A flange 143 projects downwardly and rearwardly from the rolled-under edge 146 and the flange 143 preferably can be flexed slightly due to the resiliency of the material from which the coupler is made. When installing a dummy panel to an end of an active PV panel assembly, the dummy panel is urged into engagement with the end of the PV panel assembly. This causes the flange 143 to flex as it rides up the ramp 72 of the right end coupler and to spring back to the position shown in FIG. 13 when the ramp 72 is cleared. Alternatively, the dummy panel can be pivoted in place at the junction between its coupler and the coupler of the PV panel assembly. In either event, the dummy panel is coupled in end-to-end relationship with the active PV panel assembly and compresses the gasket 144 to form a seal. When installed, dummy panels appear to be part of a PV array and fill unsightly gaps along the edges of the PV array to form the neat clean aligned edge shown in FIG. 1.

Once the PV panel assembly array is installed with its dummy panels forming an aligned or otherwise neat edge along each side of the array, water barriers are required along the top edge of the array and along the left and right sides of the array. One way to accomplish this is through the use of flashing and counter flashing as illustrated in FIGS. 14-18. In the illustrated embodiments, one flashing component comprises step flashing. Step flashing is well known in the roofing industry and generally means L-shaped flashing members 171, preferably made of aluminum, that have one leg that is placed beneath the end of each course of adjacent roofing shingles and anther leg that extends up the side of the PV panel array. The step flashing members generally are installed progressively as roofing shingles are installed next to a PV array and, as they are installed; their second legs may be abutted against and/or secured to flanges 47 along the ends of the PV panel array. The step flashing members 171 of higher courses partially overlap step flashing members 171 of a next lower course. This forms a cascade effect and, along with the shingles with which the step flashing members are interleaved, prevents water from entering beneath the array at its ends.

Figure 14:
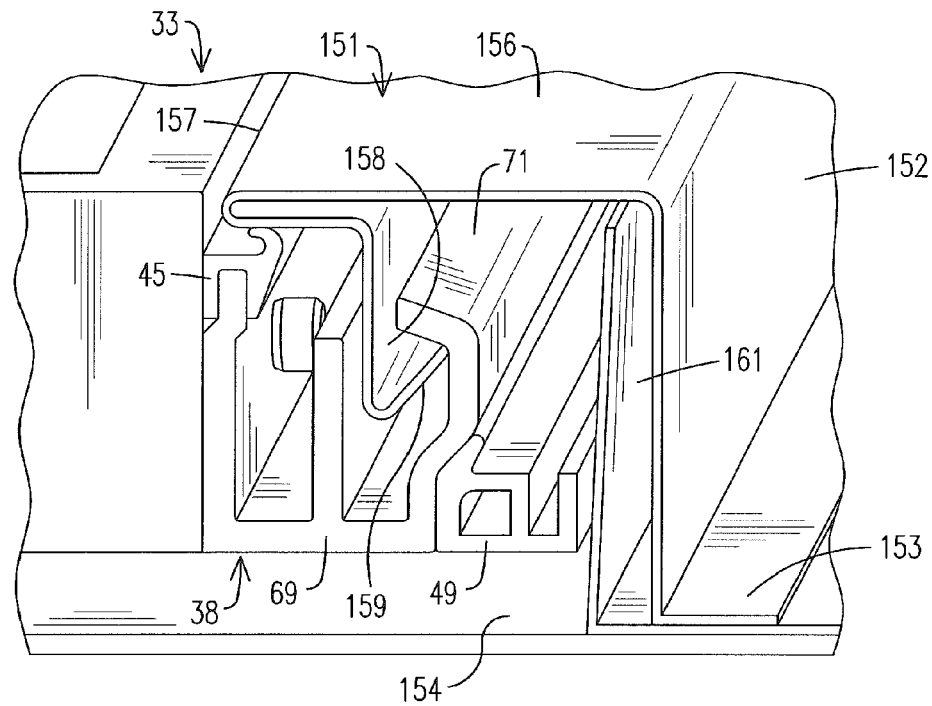
FIG. 14 is an enlarged perspective view illustrating one embodiment of a right end counter flashing for flashing the PV array to the roof on the right edge of the PV array.

When the step flashing members 171 are installed along the edges of a PV array, counter flashing is then preferably installed that overlaps the step flashing members 171 to enhance resistance to water penetration. Since the right ends of the PV panel assemblies and dummy panels bear right end couplers and their left ends bear left end couplers that are different from the right end couplers, unique right and left counter flashing members are used along respective edges of the installed array. FIG. 14 illustrates one embodiment of a counter flashing strip that can be used at the exposed right ends 33 of PV panel assemblies and dummy panels. As described above, these exposed right ends carry right end couplers 34 having locking tabs 71 and a gasket 45. A counter flashing member 151, which may be fabricated of aluminum or other appropriate material, is formed with a vertical leg 152 terminating along its bottom edge in an outwardly projecting foot 153. The outwardly projecting foot is located to overly the previously installed step flashing members 161 and roofing shingles below. A horizontal leg 156 projects inwardly from the upper edge of the vertical leg 152 and terminates at a rolled-under edge 157. A flange 158 depends from beneath the horizontal leg 156 and carries an upturned locking tab 159 at its lower end.

The counter flashing member 151 can be installed on a right end coupler 34 as shown with the locking tab 159 of the counter flashing, ember lodged beneath the locking tab 71 of the right end coupler. This compresses the gasket 45 as shown and for water seal along the rolled-under edge 157 of the counter flashing member. Preferably, gasket 49 is positioned to bear against the step flashing members 161 as well, thereby enhancing a seal along the step flashing members and the right end of the PV array. When a counter flashing member or members is installed on the exposed right end of a PV panel array overlapped with previously installed step flashing, the counter flashing and step flashing forms a barrier that prevents rainwater from entering beneath the PV panel array. Because of its effectiveness, step flashing and counter flashing are commonly used along the intersection of a wall or chimney and the shingled deck of a roof.

Figure 15:
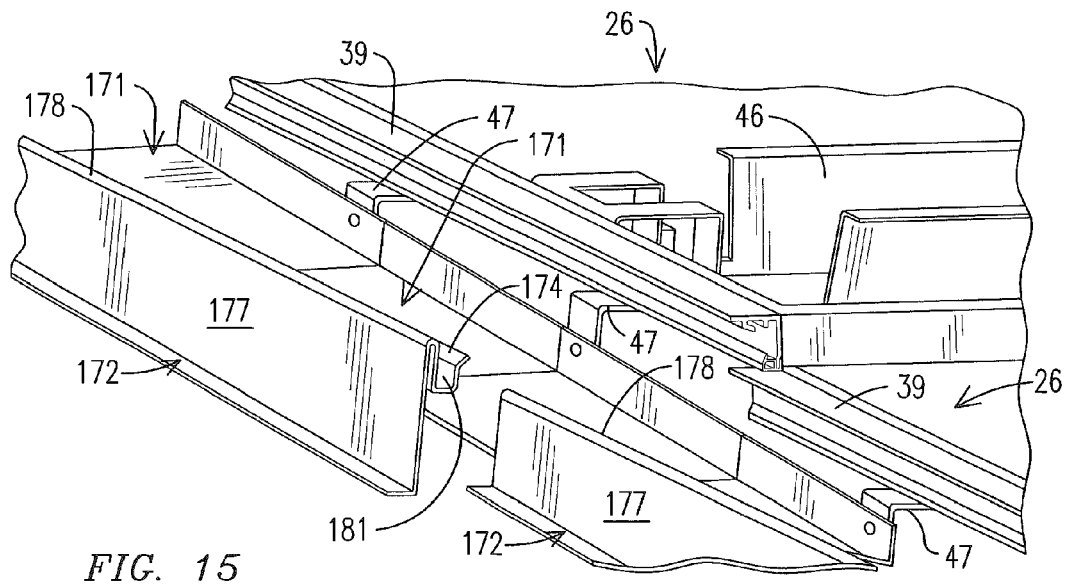
FIG. 15 is a perspective view of illustrating one embodiment of a left end step flashing and counter flashing for flashing the array to the roof on the left end of the PV array.
Figure 16:
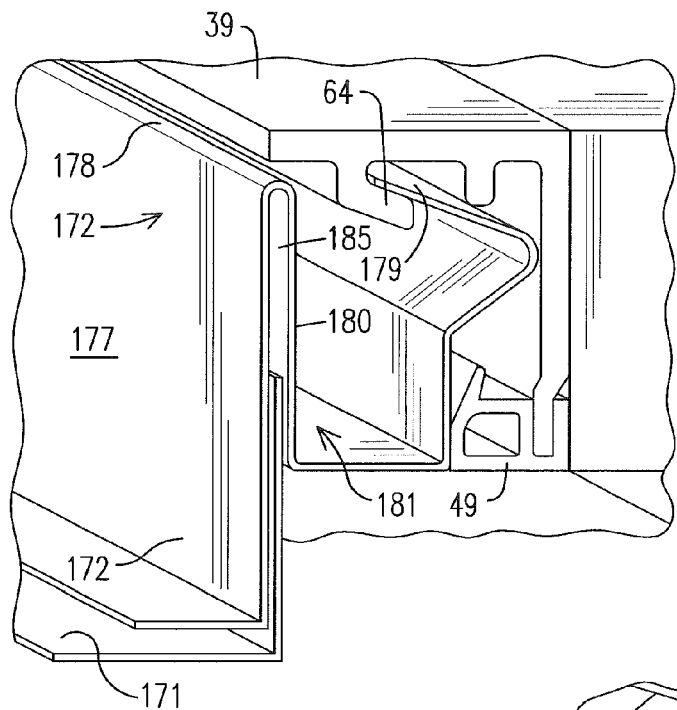
FIG. 16 is an enlarged perspective showing the connection of the left end counter flashing of FIG. 12 to the left end coupler of a PV panel assembly.

FIGS. 15 and 16 illustrate one embodiment of counter flashing for use along the left edge of an installed PV array. Here, step flashing members 171 are shown previously installed along the edge of the array and positioned by the flashing support flanges 47. While not shown, it will be understood that the step flashing members are each disposed beneath the end shingle of a course of roofing shingles adjacent the PV array. The counter flashing members 172 may then be installed on the exposed left ends of each PV panel assembly and dummy panel in such a way that they drape over the vertical legs of the step flashing members 171. The end of each PV panel assembly along an edge of the PV array receives a corresponding counter flashing member 172 with the counter flashing members of lower courses being overlapped slightly with those of upper courses. As perhaps best illustrated in FIG. 16, the left edge counter flashing strips 172 are formed with a vertical outer wall 177 that terminates at its upper extent in a rolled edge 178. A vertical inner wall 180 projects downwardly from the rolled edge and is spaced from the outer wall 177 to define a vertical slot 185. The counter flashing member 172 is further formed to define an internal trough 181 inboard of the vertical inner wall 180. An angled locking tab 179 is configured to wedge behind the locking tab 64 of the left end coupler 39 to hold the counter flashing member 172 in place. When installed, the slot 185 may at least partially receive the vertical legs of the previously installed step flashing members 171 as shown in FIG. 16.

The counter flashing strip 172 connects to the left end coupler 39 of a corresponding PV panel assembly and is locked in place by the locking tab 179. At the same time, the gasket 49 is compressed against the inner wall of the trough 181 as shown to form a moisture seal at this location. Water that may leak beneath the left end coupler 39 and the counter flashing member 172 falls into the trough 181 and is directed downwardly to the lower end of the array where it can be safely expelled. Further the counter flashing members extend downwardly to overlie and cover the previously installed step flashing members 171 thus forming a water shed that insures against windblown rain seeping behind the step flashing members and onto a bare roof deck below.

Figure 18:
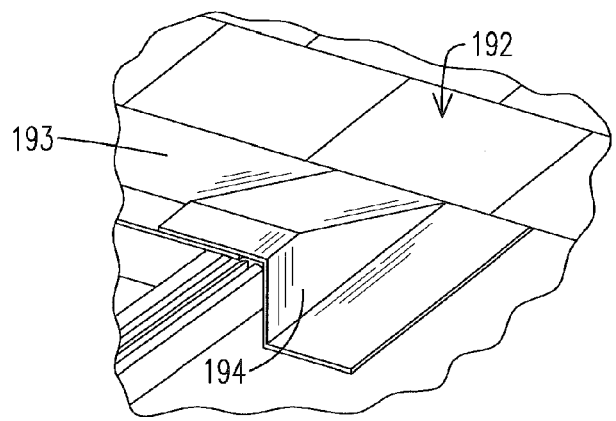
FIG. 18 is a perspective view of a rear corner of a PV array illustrating one embodiment of a corner flashing component for flashing the array to the roof at its back corners.
Figure 17:
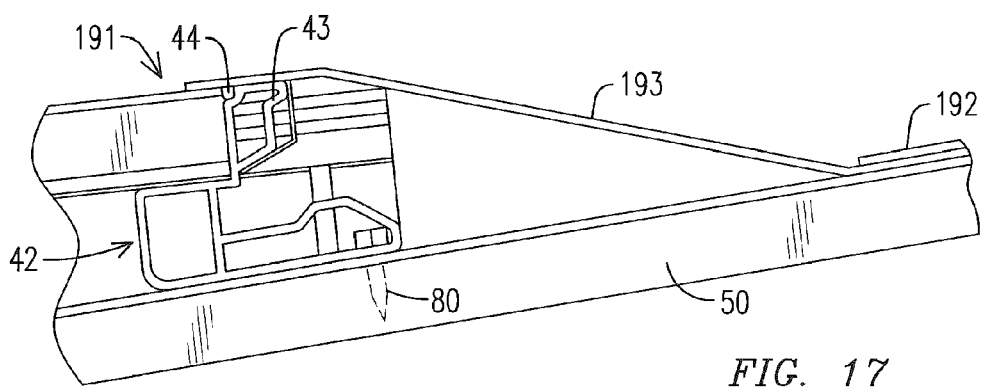
FIG. 17 is a side view along the back edge of a PV array illustrating one embodiment of flashing for the back edge of the array.

FIGS. 17 and 18 illustrate one possible structure for flashing along the top edge and at the top corners of an installed PV array according to one embodiment. In FIG. 17, the back edge 191 of an installed PV array is shown with its back edge coupler 42 being fastened to a roof deck 50 with screws 80 or other appropriate fasteners. A lowermost course of shingles 192 extends along and is spaced from the back edge of the array. A flashing strip 193 extends from beneath the lowermost course of shingles 192 away from the roof deck and rests atop the PV panel assemblies along the back edge of the array. The flashing strip 193 may be attached to the deck 50 beneath the roofing shingles with roofing nails or other appropriate fasteners. Likewise, the flashing strip may be attached to the seal strip 43 with screws, adhesive, or other fasteners so that the flashing strip compresses the gasket 44 of the seal strip 43 forming a seal against windblown rain. Rainwater that is shed down the roof shingles 192 is directed by the flashing strip 193 to the upper surfaces of the PV panel assemblies of the top course. From there, the rainwater cascades down the faces of the PV panel assemblies of the array without leaking at the vertical or the horizontal joints of the PV panel assemblies because of the sealed interfaces described above.

As shown in FIG. 18, the top corners of the installed PV array may be covered with a molded or formed corner cap 194 that covers the ends of the top flashing strip 193. The corner cap 194 also covers the upper ends of step flashing and counter flashing members along the ends of the uppermost PV panel assemblies. In this way, water is prevented from seeping beneath the assembly at the top corners thereof.

FIGS. 19-29 illustrate an alternate embodiment of the invention that is modified somewhat in its details from the just described embodiment and includes additional novel features. However, many other details of this alternate embodiment are not significantly different from those of the previously described embodiment. Where this is the case, such details will not be described in depth a second time in the discussion of the alternate embodiment that follows.

Figure 19:
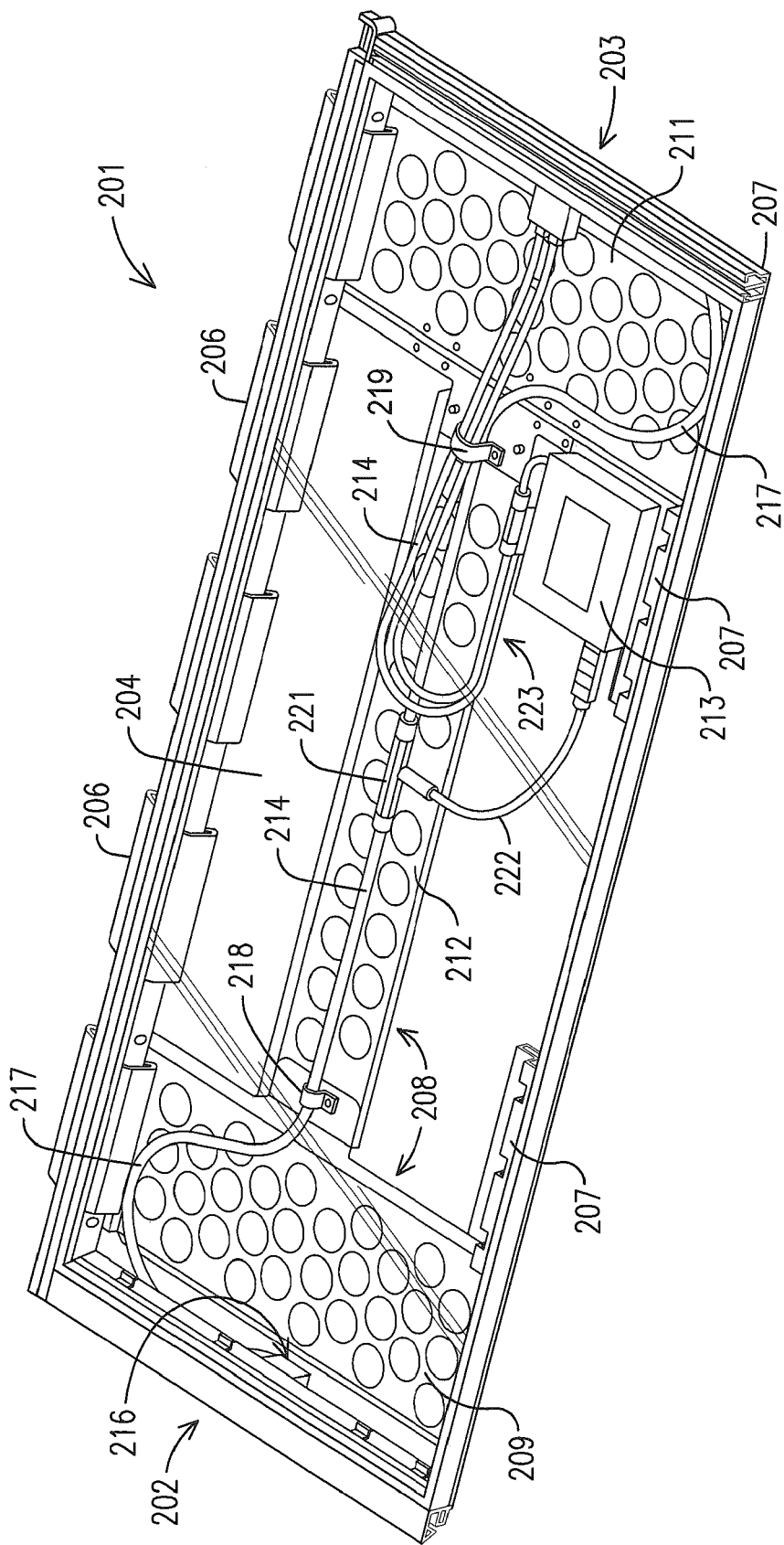
FIG. 19 is a perspective view of a PV panel assembly configured according to an alternate embodiment.

FIG. 19 shows a PV panel assembly 201 that incorporates a commercially available solar panel 204 (shown transparent in FIG. 19 for clarity) having a peripheral frame. A left end coupler 202 is attached along the left end of the PV panel and a right end coupler 203 is attached along the right end of the panel. Five spaced apart top edge couplers 206 are attached along the top edge of the PV panel and a pair of bottom edge couplers 207 is attached in spaced relationship along the bottom edge of the PV panel. A cable tray 208 is attached beneath the PV panel and is configured to support and facilitate management of the various electrical cables of the assembly. More specifically, in this embodiment, the cable tray 208 comprises a left panel 209 and a right panel 211. The left and right panels extend from the top edge to the bottom edge of the PV panel. A relatively narrow central panel 212 spans the left and right panels and all of the panels are perforated to reduce amount of material used, to reduce weight of the assembly, and to promote ventilation beneath the assembly. Unlike the prior embodiment, the cable tray of this embodiment does not rest on a roof deck to provide support for the PV panel assembly, but rather serves merely as a cable management feature and to keep the various cables of the assembly raised above a roof deck.

A micro-inverter 213 is mounted beneath the solar panel 204 and receives DC input from the solar panel via input cables 223. AC output from the micro-inverter is directed through output cable 222 to splitter 221 and onto main AC cable 214. The main AC cable 214 is terminated at its left end with a female (or male) electrical connector and is terminated at its right end with a male (or female) electrical connector (not visible). The main AC cable 214 may be secured with clips 218 and 219 integrated into the PV panel assembly. Excess cable at the left and right ends of the main cable 214 is snaked up (or down) through a bend 217 that is supported on a respective one of the end panels 209 and 211. The width of the end panels 209 and 211 is selected to accommodate the rather large minimum bend radius of the main AC cable 214, which typically is rather thick. Significantly, the left and right ends of the main cable 214 can be reoriented if needed so that the electrical connector can extend upwardly as shown on the right in FIG. 19 or downwardly as shown on the left in FIG. 19. To change the direction, an installer need only manipulate the end portion of the cable 214 so that it bends in the opposite direction atop the end panel of the cable tray. This may be necessary, for instance, when connecting one course of PV panel assemblies to a next higher or next lower course or in other instances.

Figure 20:
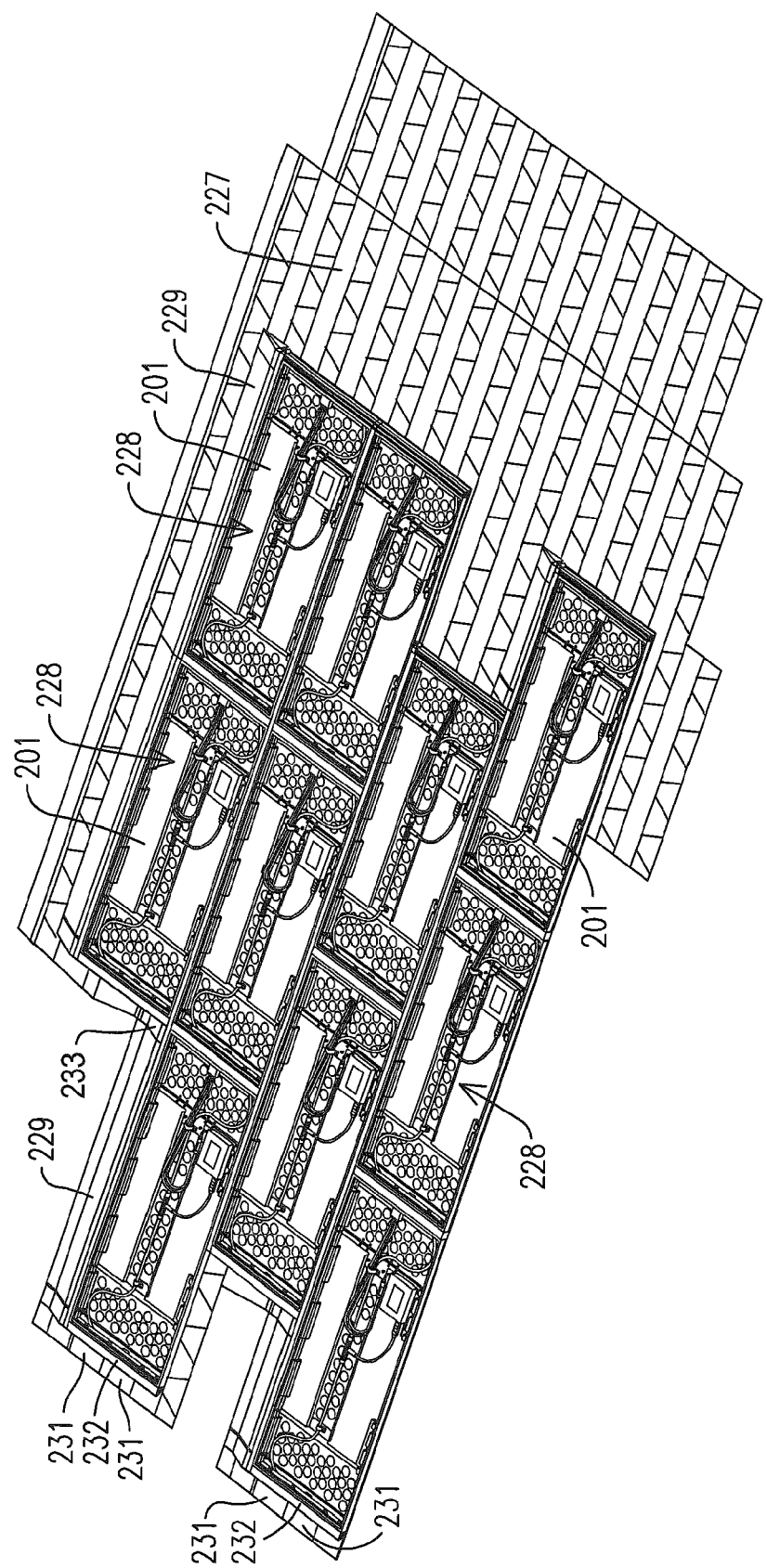
FIG. 20 is a perspective view of an array of PV panel assemblies of FIG. 19 installed on a roof.

FIG. 20 illustrates an installation or array 228 of PV panel assemblies 201 of FIG. 19 on a roof 227. As with the prior embodiment, the PV panel assemblies are coupled together end-to-end and the courses of PV panel assemblies are coupled together top-to-bottom in manners described in more detail below. The panel assemblies 201 may be installed in an aligned array as shown in the top two courses of PV panel assemblies in FIG. 20; in a staggered array as shown in the bottom two courses of FIG. 20; or in other arrangements determined by a contractor. FIG. 20 also shows various flashing components for preventing migration of rainwater beneath the installation 228. These include, for example, top flashing 229, step flashing 231, counter flashing 232, inside corner flashing 233 among other flashing components. These flashing components will be described in more detail below. It will be noted that the installation of FIG. 20 does not include faux panels filling gaps at the ends of the installation. Such faux panels are described in more detail below and may be used by a contractor to fill gaps at the end-of a PV panel assembly installation and thereby provide a cleaner looking array on a roof.

Figure 21:
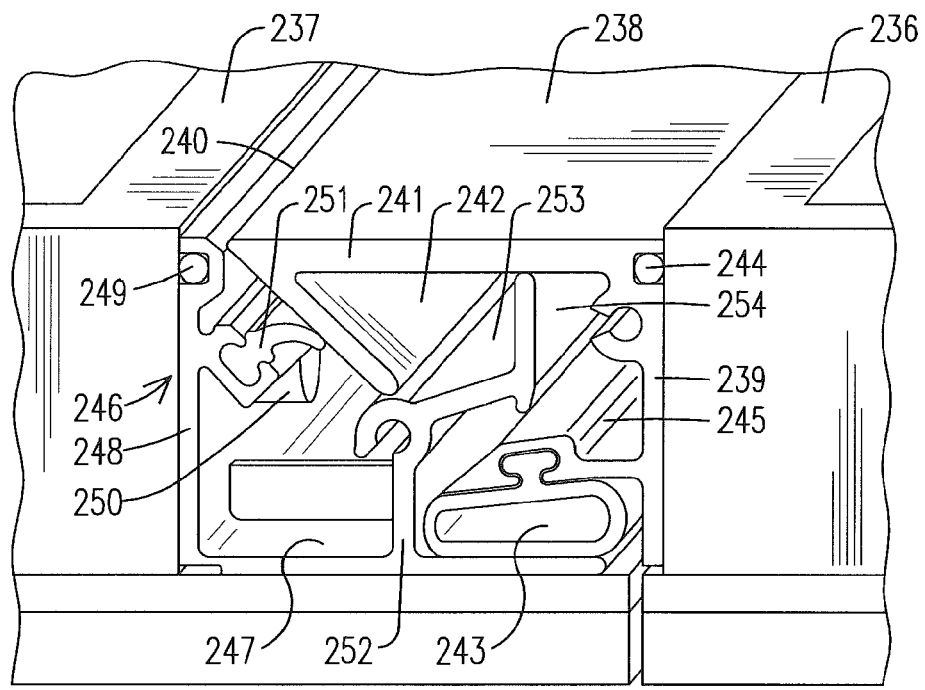
FIG. 21 is a perspective view illustrating an alternate embodiment of left and right end couplers.

FIG. 21 is a perspective end view showing two PV panel assemblies coupled together end-to-end and illustrates an alternate and enhanced embodiment of the left end and right end couplers that differs from those of the previously described embodiment. The left end coupler 238 is shown attached to the left end 236 of a first solar panel and the right end coupler 246 is attached to the right end 237 of a second solar panel. The couplers preferably are made of extruded aluminum, but other materials such as steel or plastic may be substituted to obtain similar results. The left end coupler 238 comprises a vertical leg 239 that is attached to the left end 236 with rivets or other appropriate fasteners (not visible). A horizontal leg 241 projects from the vertical leg 239 to a distal edge 240 located adjacent the right end 237 of the second solar panel. A ramp 242 projects at an angle downwardly and in inwardly beneath the distal edge 240. The left end coupler 238 is further formed with a T-channel member 245 that extends inwardly from the vertical leg 239 and is configured to secure a compressible bulb gasket 243. A groove adjacent and extending along the upper edge of the vertical wall 239 is shaped to receive a bead gasket 244, which forms a seal between the left end coupler 238 and the left end 236 of the solar panel.

The right end coupler 246 is configured with a vertical leg 248 attached to the right end 237 of the second solar panel with rivets 250 or other appropriate fasteners. A bead gasket 249 is disposed in a groove extending along and adjacent the upper edge of the vertical leg and forms a seal against the vertical leg and the right end 237 of the solar panel. A horizontal leg 247 projects outwardly from the lower edge of the vertical leg to an edge. A support leg 252 extends upwardly from the horizontal leg 247 intermediate its ends and supports an angled ramp surface 253 and an upstanding tab 254 along the distal end of the ramp surface 253. A fin or wiper gasket 251 is secured in a T-slot formed with and extending along the vertical leg 248 of the right end coupler 246 and extends upwardly at an angle therefrom. In FIG. 21, the left and right end couplers are shown coupled together joining and sealing between the two PV panel assemblies. More specifically, the bulb gasket 243 of the left end coupler is shown compressed against the upper surface of the horizontal leg 247 of the right end coupler forming a seal at that location. The wiper gasket 251 is seen to be bent and bearing against the ramp 242 thereby forming a seal at that location.

During installation, two PV panel assemblies are coupled together end-to-end with the left and right end couplers in a manner similar to that used for the end couplers of the previous embodiment. More specifically, the left and right ends of two PV panel assemblies are urged together by an installer. As the ends draw nearer, the ramp 242 first engages and begins to ride up the tab 254 raising the left end 236 of the first panel relative to the right end 237 of the second panel. The tab 254 may thus be thought of as a ramp follower. At some point, the ramp 242 clears the tab 254 and drops down to engage the angled ramp surface 253 thereby providing a confirming 'click' sound and feel to the installer. The edge of the ramp 242 then rides progressively down the angled extension leg to the position shown in FIG. 21. This, in turn, brings the bulb gasket 243 progressively into engagement with the vertical leg 247 of the right end coupler 246 and progressively moves the ramp 242 into compressive or bending engagement with the wiper gasket 251. Seals are thus formed at the locations of the bulb gasket 243 and the fin gasket 251 against migration of rainwater through the junction of the two PV panel assemblies. Even if a perfect seal is not formed by the fin gasket 251, any water that breaches the seal will simply fall into the channel below to be shed downwardly to the bottom edges of the panel assemblies from where it can cascade down the array.

Figure 22:
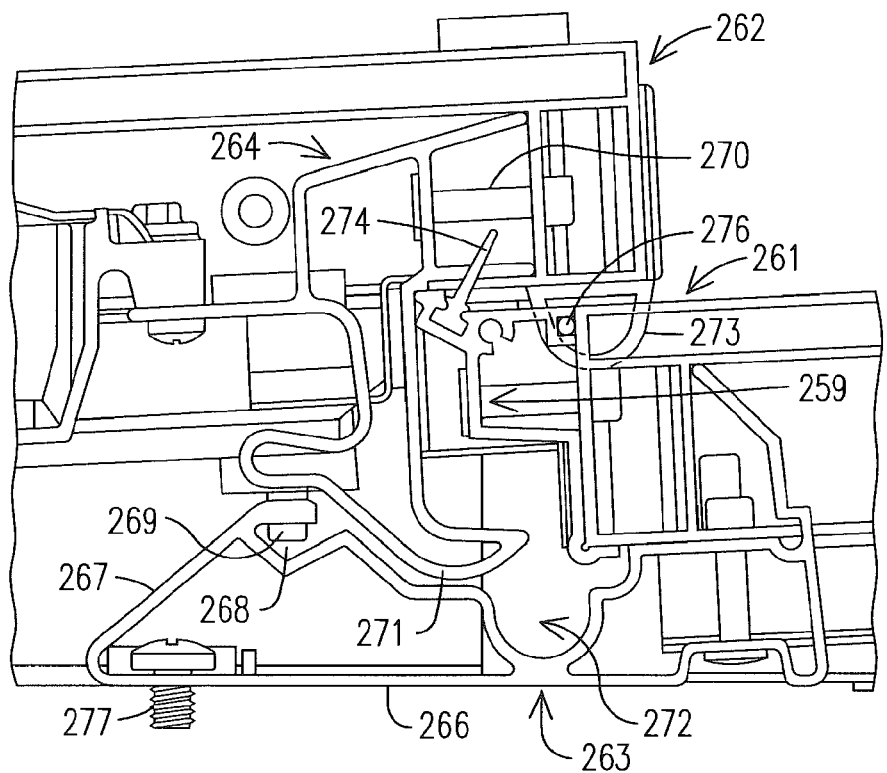
FIG. 22 is and end view illustrating an alternate embodiment of the top and bottom edge couplers.

FIG. 22 illustrates alternate embodiments of the top and bottom edge couplers for coupling panels together in a top-to-bottom relationship that include additional and novel features. As with the prior embodiment, a plurality of top edge couplers are attached in spaced relationship (see FIG. 19) along the top edge of each panel assembly. Similarly, a pair of spaced apart bottom edge couplers 264 is attached along the bottom edge of each panel assembly. Each top edge coupler 263 comprises a rearwardly extending base 266 and a sloped ramp 267. Unlike the prior embodiment, the top edge connectors of this embodiment are further formed to define a V-shaped ground wire channel 268 with grounding screw 269 that threads into the ground wire channel. The back edge coupler 263 is formed with a U-shaped portion 272 that defines a cable race to aid in routing cables of the system beneath a panel installation and may be fastened to an underlying roof deck with screws 277.

Each bottom edge coupler 264 attaches with appropriate fasteners such as rivets 270 to the bottom edge of a solar panel and extends downwardly therefrom. The lower extent of each bottom edge coupler 264 is configured to define a tongue 271 with the illustrated shape, which is somewhat different than the configuration of the tongue in the previous embodiment. A separate top edge extrusion 259 is attached with appropriate fasteners to the extreme top edge of the PV panel assembly and extends the entire length thereof. The top edge extrusion 259 carries an upwardly projecting wiper gasket 274 and a bead gasket 276, and the bead gasket 276 compresses against and forms a seal along the extreme top edge of its solar panel. A bulb gasket 273 extends along the entire length of and depends from the bottom edge of each PV panel assembly.

Two PV panel assemblies are coupled together in a top-to-bottom relationship in substantially the same way as with the prior embodiment. That is, a lower course of PV panel assemblies are installed in end-to-end relationship on a roof deck as described above by coupling them together end-to-end and screwing each assembly to the roof deck through its top edge couplers. In the present embodiment, a copper ground wire may then be inserted through the V-shaped ground wire channels 268 of the exposed top edge connectors 263 and the grounding screws 269 tightened onto the ground wire to make a secure electrical connection. This ground wire attaches to at least one top edge connector of each PV panel assembly of an installation and provides a separate and redundant system ground for the installation to enhance safety. AC power cables of the system can then be routed through selected ones of the cable races 272 of the exposed top edge couplers to help hold them in place for interconnecting courses of PV panel assemblies together electrically.

A PV panel assembly of a next higher course is then slid down the roof toward PV panel assemblies of the lower course with each bottom edge connector of the panel assembly aligned with a selected corresponding top edge connector of one or more PV panel assemblies of the lower course. The two bottom edge couplers of each PV panel assembly are space to align with corresponding ones of the five top edge couplers of the next lower course to form a variety of possible offsets between panels of adjacent courses. For example, panels in adjacent courses may be offset relative to each other by one quarter, one third, or one half the width of a panel assembly. As the panel assemblies are urged together top-to-bottom, the tongues 271 of the bottom edge couplers of the upper panel assembly ride up the ramps 267 of the top edge couplers of the lower panel assembly(s). This elevates the bottom edge of the upper panel assembly above the top edge of the lower panel assembly. The tongues 271 then crest the ramp 267 and slide down the other side to the position shown in FIG. 22. This provides a confirming "click-lock" sound and feel to the installer. More importantly, however, it causes the bottom edge of the upper PV panel assembly to drop down into overlapping relationship with the top edge of the lower PV panel assembly. This motion, in turn, compresses the bulb gasket 273 between the two edges to form a primary seal. Simultaneously, the fin seal 274 is engaged and bent down between the bottom edge of the upper PV panel assembly and the top edge extrusion 259. This forms a secondary seal between the two PV panel assemblies to provide further assurance against rainwater leakage between panels.

Figure 23A:
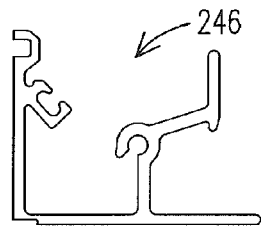
FIGS. 23a through 23e are end views illustrating the five aluminum extrusions used to fabricate the left and right end couplers and the top and bottom edge couplers of FIGS. 21 and 22.
Figure 23B:
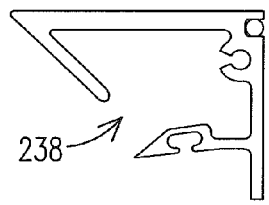
Figure 23C:
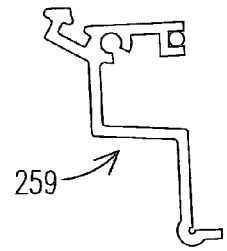
Figure 23D:
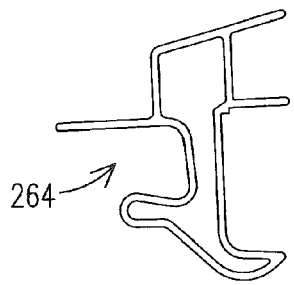
Figure 23E:
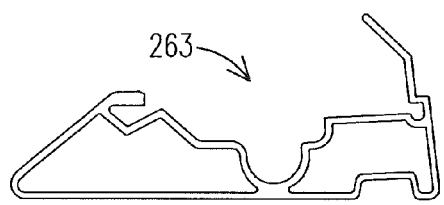

FIGS. 23*a* through 23*e* illustrate perhaps more clearly the separate extrusion profiles of each of the just described end and edge couplers. FIG. 23*a* shows the profile of a right end coupler 246 and FIG. 23*b* shows the profile of a left end coupler 238. The separate back edge extrusion 259 is shown clearly in FIG. 23*c*. FIG. 23*d* illustrates the profile of the bottom edge couplers 264 while FIG. 23*e* shows the profile of the top edge couplers 263 with their V-shaped ground wire channels and cable races. Of course, variations of the profiles may well be imagined and implemented by the skilled artisan without departing from the invention embodied in these particular example profiles.

Figure 24:
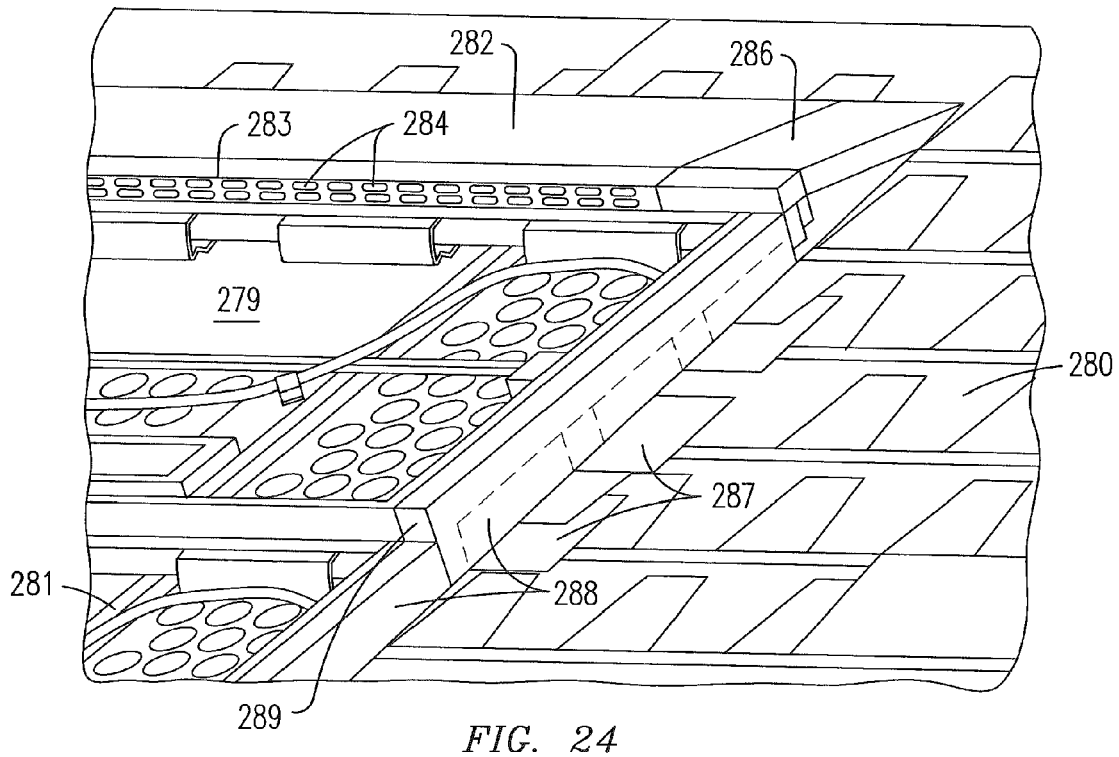
FIG. 24 is a perspective view showing a portion of an installed PV panel array and illustrating alternate PV panel assemblies and some of the flashing components used to prevent water penetration beneath the panel assemblies.

FIG. 24 illustrates alternate embodiments of some of the various flashing components used to prevent rainwater migration beneath a PV panel installation. In this figure, an upper right corner of an installation of vertically aligned PV panel assemblies 279, 281 is shown. Top flashing 282 extends from beneath a course of shingles 280 above the installation to a position overlying the uppermost edge of the PV panel assembly installation. Unlike the prior embodiment, the top flashing of this alternate embodiment has an exposed front edge 283 that is formed with an array of louvers 284 forming a ventilation grid along the uppermost edge of the assembly. It has been found that substantial heat can be generated below a PV panel assembly installation. The ventilation grid formed by the array of louvers 284 promotes convective flow of this heated air beneath the installation for cooling. As an alternative, the heat developed beneath a PV panel assembly installation may be harvested with heat exchangers or other devices disposed beneath the assembly and harvested heat may be stored as, for example, hot water for use by a consumer.

Referring again to FIG. 24, a straight corner flashing component or corner cap 286 is shown covering the upper right corner of the installation and is formed with a side skirt that forms a counter flashing extending down the edge of the straight corner flashing component. Also shown in FIG. 24 are step flashing components 287 installed in the traditional way beneath successive courses of shingles with the hidden vertical legs of the step flashing shown behind the counter flashing in phantom lines. A right end counter flashing component 288, described in more detail below, is attached along the edges of the PV panel assemblies and each has an outside skirt that overlies the vertical legs of the step flashing components 287 thus forming counter flashing. Caps 289 may be snapped or otherwise installed in the ends of the counter flashing components 288 if desired. As with the prior embodiment, rainwater is shed up and over the PV panel assembly installation and is shed away from edges and corners of the installation. It has been found that properly installed flashing components substantially prevent rainwater from penetrating beneath a PV panel assembly installation. Any water that may seep beneath the assembly is shed down the roof and beneath the forward edge of the installation by an underlayment membrane beneath the installation.

Figure 25:
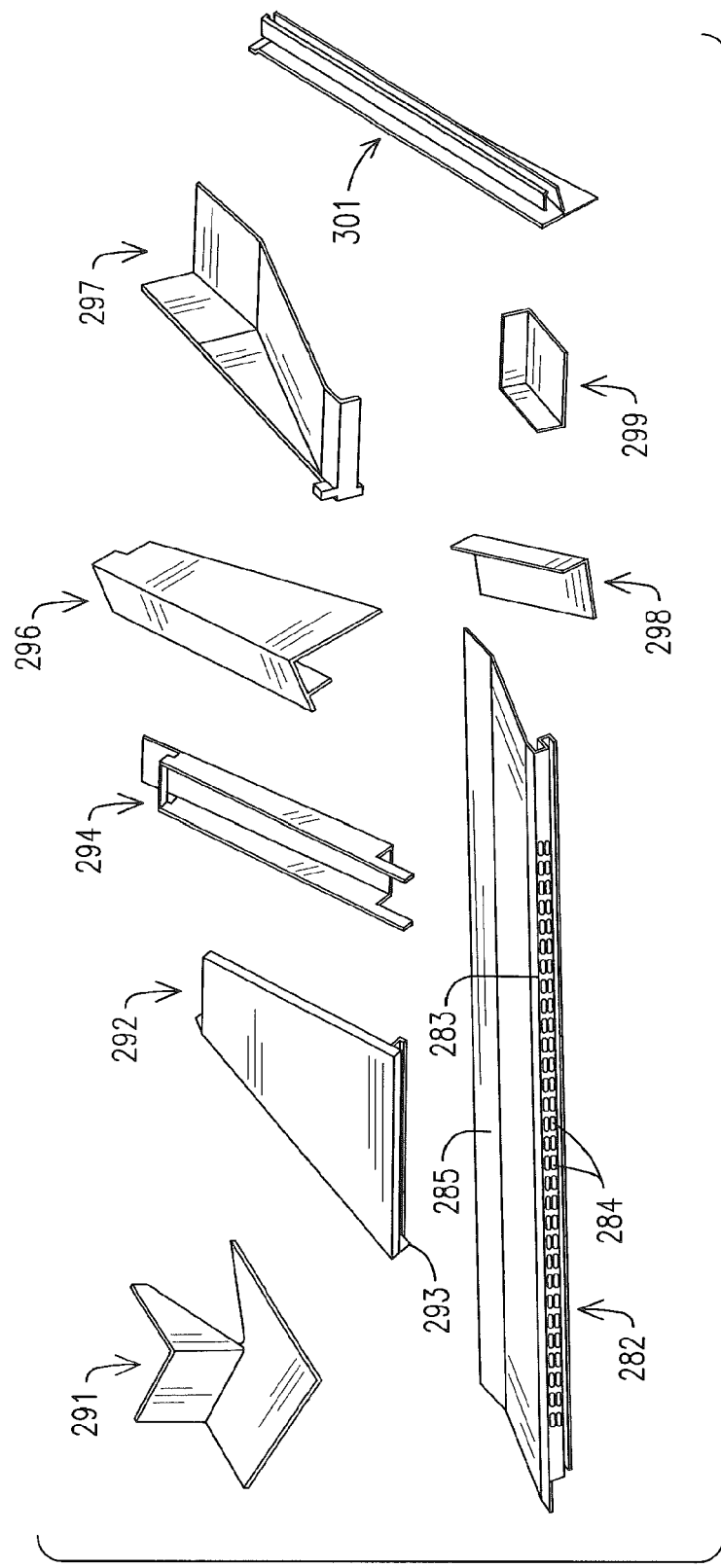
FIG. 25 illustrate nine (9) formed metal components that are used to fabricate all needed flashing components for a PV system installation such as that shown in FIG. 24.

FIG. 25 shows an array of various flashing and faux panel components of the system of this embodiment that may be formed or extruded from metal or other appropriate material. More specifically, component 291 is a top angled corner flashing component for flashing the top corner of a PV panel assembly installation that forms an angle rather than the straight corner shown at 286 in FIG. 24. Component 292 have an outer edge 293 is an example of a faux panel for filling gaps at the ends of a PV panel assembly installation, as will be described in more detail below. Component 294 is a support rib for mounting to the bottom of a faux panel to support the panel on a roof deck. Component 296 is a right end counter flashing member such as that shown in FIG. 24 at 288. Component 297 is a lower inside corner flashing member for flashing lower inside corners of an installation, as described in more detail below. Component 282 is a top flashing member having an elevated forward edge 283 and ventilation louvers 284. Component 298 is a step flashing member and component 299 is an inside corner flashing member. Finally, component 301 is a left end counter flashing member for counter flashing the left-most edge of a PV panel or faux panel. The right end counter flashing 296 and the left end counter flashing 301 are formed with features that interlock with the right end and left end couplers 203 and 202 (FIGS. 19, 21, and 22) at respective ends of PV panel assemblies to counter flash the edges of a PV panel assembly installation.

Figure 26:
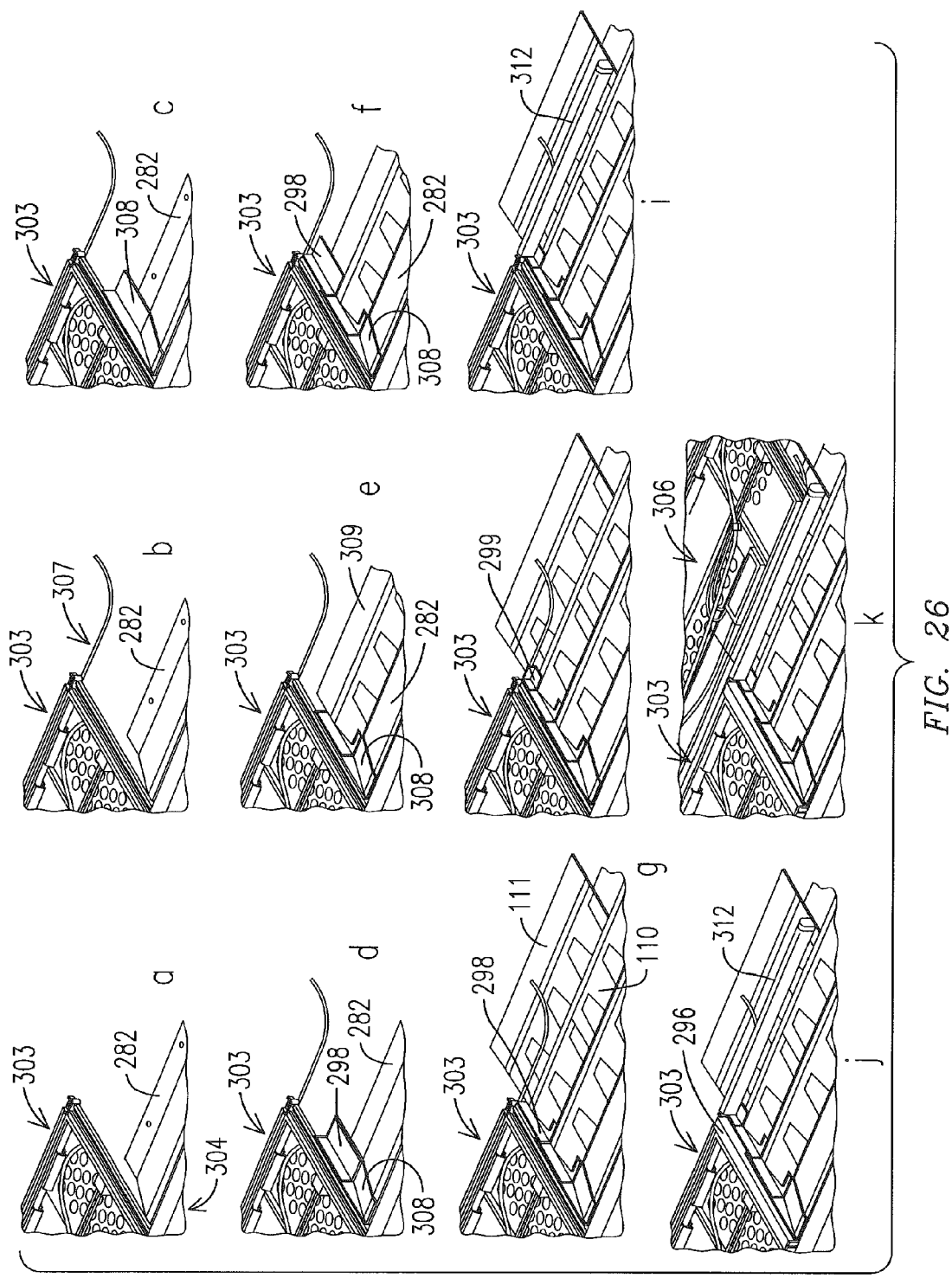
FIG. 26 shows in sequence (a-k) the installation of various flashing components and particularly the inside corner flashing component shown in FIG. 25.

FIG. 26 shows a sequence of 11 frames (a-k) illustrating progressively the installation of numerous flashing components to flash a gap at an end of a PV panel assembly installation when faux panels are not to be used to fill the gap. In frame a, 304 is a right-most end PV panel assembly of an already installed lower course of PV panel assemblies and 303 is the right-most PV panel assembly of an upper course of PV panel assemblies. It can be seen that the PV panel assembly 304 extends further to the right than PV panel assembly 303 thereby defining a gap along the right-most edge of the installation. Another course of PV panel assemblies is to be installed above the course of which panel assembly 303 is a member, and it too will extend further to the right to define the upper edge of the gap. A first step in the installation method is to install a length of top flashing 282 along the top edge of the PV panel assembly 304. Next (frame b) an AC cable adapter 307 is routed from panel 303 and positioned to be electrically connected to the AC cable of the next higher course of PV panel assemblies. When this cable adapter has been connected and positioned, a lower inside corner flashing member 308 (frame c) is attached at the lower inside corner of the gap covering the end of the top flashing 282 and extending up the end of panel assembly 303.

In frame d, a length of step flashing 298 is laid atop the upper portion of the lower inside corner flashing 308 and in frame e, a course of shingles 309 is installed against the panel 303 covering the step flashing 298 and the upper edge of the top flashing 282. In frame f, another piece of step flashing 298 is installed against the PV panel assembly 303 overlying the headlap portion of shingle 309 as is typical when installing step flashing during a roofing installation. In frame g, another course of shingles 110 is installed against the PV panel assembly 303 overlying the step flashing 298 and an additional course of shingles 111 is installed above the course 110 to extend beneath the next higher course of PV panel assemblies. The AC cable is routed atop this course of shingles.

Next, in frame h, an upper inside corner flashing 299 is installed at the top corner of PV panel assembly 303 overlying the shingles. In frame i, a starter bar 312 is installed on the shingles covering the top flap of the upper inside corner flashing 299 and oriented coextensively with the top edge of PV panel assembly 303. This starter bar will provide support for a PV panel assembly of the next higher course that extends beyond the right end of panel assembly 303. In frame j, right end counter flashing 296 is fastened to the right end coupler of the PV panel assembly 303 and extends downwardly over the vertical legs of the step flashing and corner flashings to provide counter flashing along the end of the panel 303. Finally, in frame k, a PV panel assembly 306 of the next higher course is installed so that the front edge of this assembly is partially supported atop PV panel assembly 303 and the other portion is supported atop the starter bar 312. The gap is thus fully flashed and waterproofed.

It is believed that contractors and installers may wish to fill gaps along ends of PV panel assembly installations with faux panels as detailed below so that the just described installation method to flash gaps will not be required. Nevertheless, the invention includes these flashing components and this flashing technique, in the event faux panels are not to be used.

Figure 27:
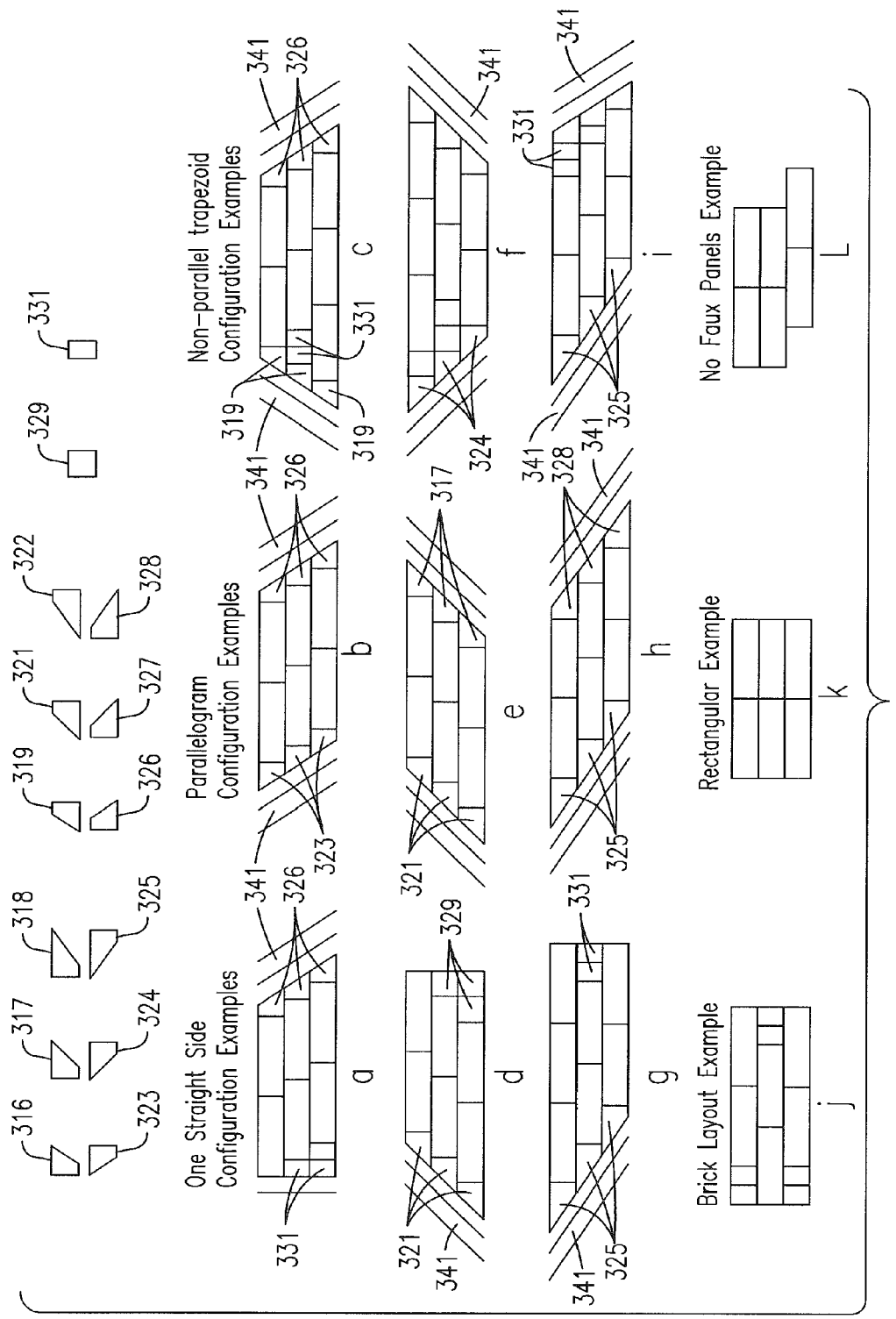
FIG. 27 illustrates a set of faux. PV panels according to an alternate configuration for creating an aesthetically pleasing edge along an installed PV panel array.

FIG. 27 illustrates the use of faux panels to fill gaps along ends of PV panel assembly installations to provide a more pleasing appearance along the ends of the installations. Faux panels are non-functioning panels that are colored to look like and blend in with the functioning PV panel assemblies. In the illustrated embodiment, a limited selection of faux panel shapes are provided that will suit the great majority of requirements to straighten out ends of PV panel installations that extend at three common roof angles. These three angles correspond to the three most common valley angles on roofs. Faux panels to fill gaps along straight end installations also are provided. The selected faux panel configurations are illustrated at the top of FIG. 27 and it will be seen that there is a right up and right down and a left up and left down version of each of the three configurations, in addition to rectangular faux panels. More specifically, there is a right up quarter panel 316, a right up third panel 317 and a right up half panel 318. Terminology like "right up quarter" refers, for example, to the fact that a panel so designated is for the right end of a PV panel assembly installation where the angle extends up the roof and the upper edge of the faux panel is a quarter of the length of a full PV panel assembly.

With continuing reference to the upper images of FIG. 27, further selected configurations of faux panels include left up quarter panels 323, left up third panels 324, and left up half panels 325. In a similar way, the selected faux panel configurations include left down quarter panels 319, left down third panels 321, and left down half panels 322. Corresponding right down quarter panels 326, right down third panels 327, and right down half panels 328 are also included in the selected configurations. The selected configurations finally include rectangular faux panels including a rectangular third panel 329, a rectangular quarter panel 331, (not shown) a rectangular half panel and a rectangular full panel.

Images a through l in FIG. 27 illustrate various configurations of PV panel assembly installations that can be obtained using the selected configurations of faux panels discussed above. In these figures, roof valleys of various angles are illustrated by reference numeral 341. Image a illustrates a quarter offset pattern installation wherein the panel assemblies of one course of PV panel assemblies are offset by a quarter of the length of a panel assembly from panel assemblies of adjacent courses. This example shows an installation with one straight end on the left and one angled end on the right adjacent the roof valley 341. Along the right end, gaps are filled with right down quarter panels 326 and the gaps along the left side are filled with rectangular quarter faux panels 331. Image b shows a parallelogram installation with two angled ends installed between two roof valleys 341. Again, the PV panel assemblies of the installation are offset by a quarter of a panel and the resulting gaps on the right are filled with right down quarter panels 326 while the gaps along the left end are filled with left up quarter panels 323.

Image c shows a trapezoid PV panel assembly installation where the installation is disposed between two downwardly extending roof valleys 341. Again, the PV panel assemblies are offset by a quarter panel and the resulting gaps along the right end are filled with right down quarter panels 326 as before. Two rectangular quarter panels 331 (or one rectangular half panel) fills the excess gap along the middle course of PV panel assemblies to even the gaps and left down quarter faux panels 319 fill the remaining gaps to provide a straight left end. Image d shows an installation where the PV panel assemblies of each course are offset by one third the length of an assembly relative to each other. Resulting gaps on the right are filled with rectangular third faux panels 329 and resulting gaps on the left are filled with left down third faux panels to result in a neat straight end for the installation.

Image e shows a parallelogram installation with PV panel assemblies offset by one third the length of a panel assembly. Here, the angled right end gaps are filled with right down third faux panels and the gaps on the left end are filled with left down third faux panels. Image f shows a trapezoidal installation with PV panels offset by a third the length of a panel. Here, the gaps along the right end of the installation are filled with right down third faux panels. On the left, excess gap width is filled with rectangular third faux panels and remaining gaps are filled with left down third faux panels. Images g through l show the same three examples except with the PV panel assemblies of each course being offset by half the width of a panel assembly to produce even more acute angles along the ends of the installation. In image g, the left end gaps are filled with left up half faux panels and the excess gap on the straight right side is filled with two rectangular quarter panels (or one rectangular half panel). Image h shows the parallelogram installation with PV panel assemblies offset by half the length of an assembly. Here, the right end gaps are filled with right up half faux panels while the left end gaps are filled with left down half faux panels.

Image i shows a PV panel assembly installation between two roof valleys of different angles and illustrates the diversity of the faux panel system of the invention. Again, the PV panel assemblies are offset by half. Along the left end of the installation, gaps are filled with left up half faux panels. However, on the right edge, excess gap portions are filled with rectangular panels and the remaining gaps are filled with right down quarter faux panels to form an end with a different angle than that of the left end. Images j and k show two possible configurations that obtain rectangular installations of PV panel assemblies, the left image being a running bond brick pattern with the right being a stacked bond pattern. Finally, image l shows an installation of PV panel assemblies where no faux panels are used and gaps are left unfilled. As mentioned above, such an installation requires rather complex flashing to seal it against migration of rainwater.

Figure 28A:
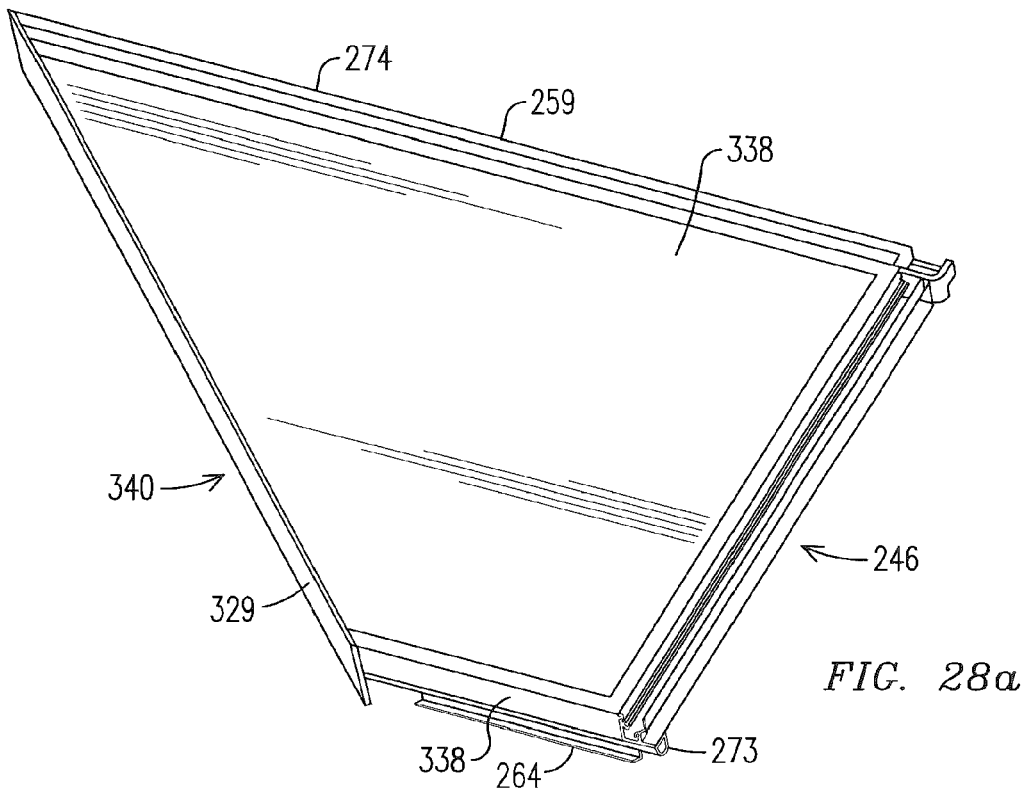
FIGS. 28a and 28b illustrate a faux panel construction according to an alternate embodiment.
Figure 28B:
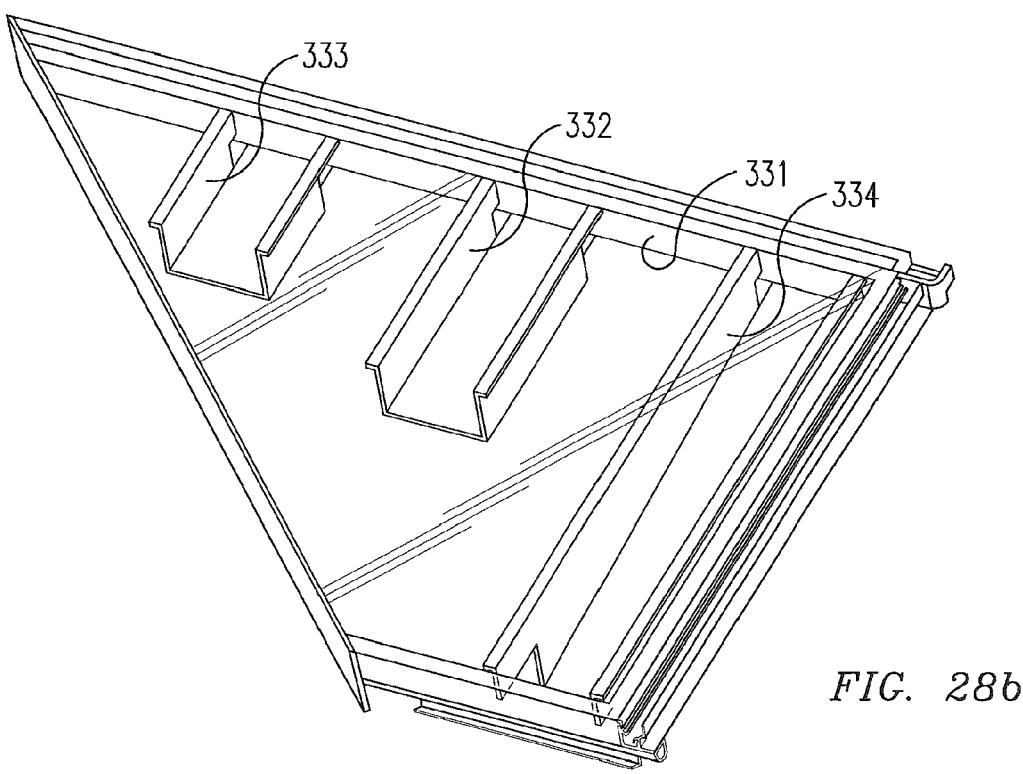

FIGS. 28a and 28b show in more detail the construction of the faux panels of the present embodiment. FIG. 28a shows the faux panel with its metal panel portion opaque to match the appearance of adjacent PV panel assemblies. FIG. 28b shows the same faux panel with its panel portion rendered as transparent in the drawing to reveal structures beneath the faux panel. The faux panel 340 has a panel portion made of formed metal or other appropriate material that has a top portion 338 painted or otherwise treated to resemble a PV panel assembly. The faux panel 340 is bent to define a bottom edge portion 338 and also is bent along its angled side to form an integrated counter flashing 329. A right end coupler 248, which is the same as the right end couplers of PV panel assemblies, is attached with rivets or other fasteners long the right end of the faux panel. Similarly, a top edge coupler extrusion 259 is attached to and extends along the top edge of the faux panel and bears fin gasket 274 as shown in detail in FIG. 22. A bottom edge coupler 264 is attached to the bottom edge 338 of the faux panel and a bulb gasket 273 extends beneath the bottom edge. Referring to FIG. 28b, a set of support ribs 331, 332, 333, and 334 of appropriate lengths are attached beneath the top panel 338 and are sized and configured to rest atop a roof deck on which the faux panels are installed to provide structure and support for the faux panels.

Figure 29:
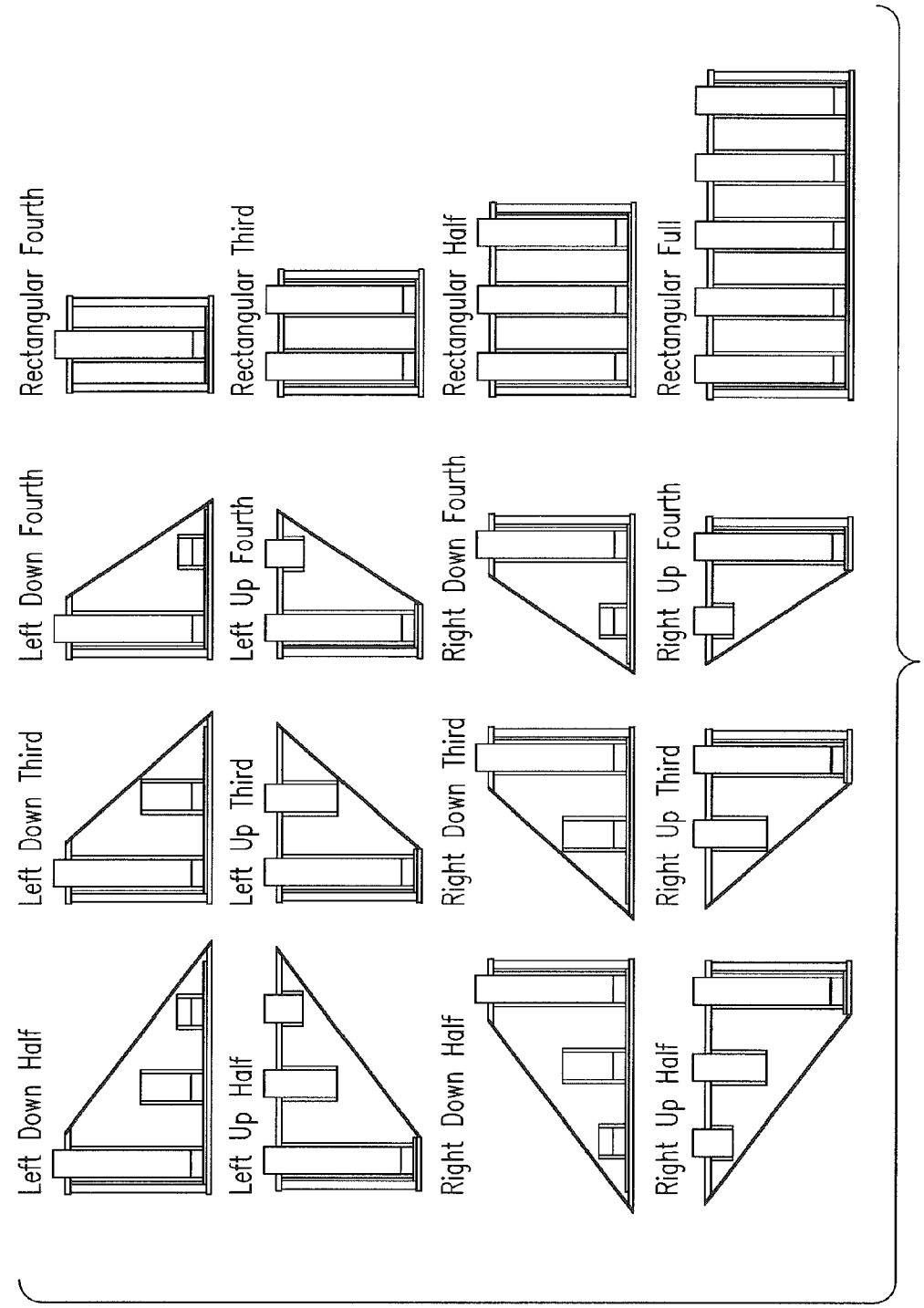
FIG. 29 illustrates in more detail the various faux panel configurations showing the relationship of their supports to their various shapes.

When installing a faux panel such as panel 340, it is coupled to adjacent PV panel assemblies in the same way that these panel assemblies are coupled to each other. This is because the faux panels 340 bear the same end and edge couplers as the functioning PV panel assemblies. Since the angled end of a faux panel always extends along the end of an entire PV panel assembly installation, step flashing can be installed along this end simply by sliding step flashing components beneath the integral counter flashing 329 of the faux panel with shingle courses overlapping the step flashing as is customary in shingle installation. FIG. 29 shows various faux panel configurations from the undersides thereof to illustrate one preferred placement and sizing of the support ribs beneath the faux panels. Other configurations and positioning may be used, of course, and the illustrated ones are exemplary only. Each faux panel has at least one support rib that is formed with a top tab extending beyond the top edge of the faux panel. This provides a fastening tab for the faux panels, which are fastened to a roof deck with screws or other fasteners driven through the fastening tabs.

The invention has been described herein within the context and in terms of preferred embodiments and methodologies that represent the best modes known to the inventors of carrying out the invention. However, the embodiments presented above and in the drawing figures are not intended to represent requirements or limitations of the invention that they embody, but are presented only as exemplary embodiments of the underlying invention. Many additions, deletions, and modifications, both subtle and gross, may be made to the embodiments of the invention presented herein without departing from the spirit and scope of the invention embodied in the particular embodiments and defined by the claims hereof.

What is claimed is:

1. A photovoltaic element for joining with like photovoltaic elements on a roof to form a roof integrated photovoltaic system, the photovoltaic element comprising:
   a photovoltaic panel having a right end, a left end, a front edge, and a back edge;
   a right end coupler secured to the right end of the photovoltaic panel;
   a left end coupler secured to the left end of the photovoltaic panel;
   the right end coupler and the left end coupler being configured so that when the photovoltaic element is slid on the roof into end-to-end engagement with a like photovoltaic element on the roof, the right and left end couplers interlock and form a seal in response to being slid into end-to-end engagement;
   at least one front edge coupler affixed to the front edge of the photovoltaic panel;
   at least one back edge coupler affixed to the back edge of the photovoltaic panel;
   the front edge coupler and the back edge coupler being configured so that when the photovoltaic element is slid on a roof into top-edge-to-bottom-edge engagement with a like photovoltaic element on the roof, the front and back edge couplers of the photovoltaic elements interlock in response to being slid into top-edge-to-bottom-edge engagement.

2. A photovoltaic element as claimed in claim 1 wherein the front edge coupler and the back edge coupler are further configured so that the front edge of the photovoltaic element is elevated above the back edge of a like photovoltaic element and then drops onto the back edge of the like photovoltaic element in response to being slid on the roof into top-edge-to-bottom-edge engagement with the like photovoltaic element.

3. A photovoltaic element as claimed in claim 2 further comprising a seal positioned on the photovoltaic element and configured so that the seal becomes compressed between the front edge of the photovoltaic element and the back edge of a like photovoltaic element when the front edge of the photovoltaic element drops onto the back edge of the like photovoltaic element.

4. A photovoltaic element as claimed in claim 1 further comprising a seal on at least one of the right end coupler and the left end coupler, the seal being configured and positioned to be compressed when the left and right end couplers interlock to seal a junction between the left end coupler and the right end coupler.

5. A photovoltaic element as claimed in claim 1 further comprising a cable tray beneath the photovoltaic panel for supporting cables associated with the photovoltaic element.

6. A roof integrated photovoltaic system comprising:
   a plurality of adjacent photovoltaic panels each having a right end, a left end, a front edge, and a back edge;
   a right end coupler secured to the right ends of at least some of the photovoltaic panels;
   a left end coupler secured to the left ends of at least some of the photovoltaic panels;
   the right end couplers and the left end couplers configured to interlock and form a seal when two of the plurality of panels are moved into end-to-end engagement;
   at least one front edge coupler affixed to at least some of the plurality of photovoltaic panels at the front edges thereof;
   at least one back edge coupler affixed to at least some of the plurality of photovoltaic panels at the back edges thereof;
   the front edge couplers and the back edge couplers configured to interlock when two of the plurality of panels are moved into top-edge-to-bottom-edge engagement;
   a seal positioned to prevent water from penetrating at the junction of a front edge of one panel and the back edge of an adjacent interlocked panel;
   each photovoltaic panel producing a voltage at output terminals when the photovoltaic panel is exposed to sunlight;
   a cable having ends and being disposed beneath each photovoltaic panel, the output terminals being electrically coupled to the cable with at least one of the ends of the cable being electrically coupled to the end of a cable of an adjacent photovoltaic panel of the system to aggregate the electrical energy of the plurality of photovoltaic panels; and
   a cable tray disposed beneath at least some of the photovoltaic panels, cables of the photovoltaic panels being at least partially supported by the cable trays.

7. A roof integrated photovoltaic system comprising:
   a plurality of adjacent photovoltaic panels each having a right end, a left end, a front edge, and a back edge;
   a right end coupler secured to the right ends of at least some of the photovoltaic panels;
   a left end coupler secured to the left ends of at least some of the photovoltaic panels;
   the right end couplers and the left end couplers configured to interlock and form a seal when two of the plurality of panels are moved into end-to-end engagement;
   at least one front edge coupler affixed to at least some of the plurality of photovoltaic panels at the front edges thereof;
   at least one back edge coupler affixed to at least some of the plurality of photovoltaic panels at the back edges thereof;
   the front edge couplers and the back edge couplers configured to interlock when two of the plurality of panels are moved into top-edge-to-bottom-edge engagement;
   a seal positioned to prevent water from penetrating at the junction of a front edge of one panel and the back edge of an adjacent interlocked panel;
   each photovoltaic panel producing a voltage at output terminals when the photovoltaic panel is exposed to sunlight;
   a cable having ends and being disposed beneath each photovoltaic panel, the output terminals being electrically coupled to the cable with at least one of the ends of the cable being electrically coupled to the end of a cable of an adjacent photovoltaic panel of the system to aggregate the electrical energy of the plurality of photovoltaic panels; and
   wherein the back edge couplers are configured to define a cable race, the cables of the photovoltaic panels being at least partially supported in the cable race of at least one back edge coupler.

8. A roof integrated photovoltaic system comprising:
   a plurality of adjacent photovoltaic panels each having a right end, a left end, a front edge, and a back edge;

a right end coupler secured to the right ends of at least some of the photovoltaic panels;

a left end coupler secured to the left ends of at least some of the photovoltaic panels;

the right end couplers and the left end couplers being configured to interlock and form a seal when two of the plurality of panels are moved into end-to-end engagement;

at least one front edge coupler affixed to at least some of the plurality of photovoltaic panels at the front edges thereof;

at least one back edge coupler affixed to at least some of the plurality of photovoltaic panels at the back edges thereof;

the front edge couplers and the back edge couplers configured to interlock when two of the plurality of panels are moved into top-edge-to-bottom-edge engagement;

a seal positioned to prevent water from penetrating at the junction of a front edge of one panel and the back edge of an adjacent interlocked panel;

the left end and right end couplers being profiled such that one of the couplers is elevated relative to the other coupler and then drops onto the other coupler into locking relationship as two like photovoltaic panels are urged together end-to-end; and at least one gasket extending along the left end coupler or the right end coupler and being positioned to be compressed between the couplers when the one coupler drops onto the other coupler to form a water inhibiting seal.

9. A roof integrated photovoltaic system comprising:

a plurality of adjacent photovoltaic panels each having a right end, a left end, a front edge, and a back edge;

a right end coupler secured to the right ends of at least some of the photovoltaic panels;

a left end coupler secured to the left ends of at least some of the photovoltaic panels;

the right end couplers and the left end couplers configured to interlock and form a seal when two of the plurality of panels are slid on a roof into end-to-end engagement;

at least one front edge coupler affixed to at least some of the plurality of photovoltaic panels at the front edges thereof;

at least one back edge coupler affixed to at least some of the plurality of photovoltaic panels at the back edges thereof;

the front edge couplers and the back edge couplers configured to interlock when two of the plurality of panels are slid on a roof into top-edge-to-bottom-edge engagement;

a seal positioned to prevent water from penetrating at the junction of a front edge of one panel and the back edge of an adjacent interlocked panel;

the front and back edge couplers being profiled such that the front edge of a photovoltaic panel is elevated above the back edge of a like panel and then drops down onto the back edge of the like panel in response to the two photovoltaic panels being slid together front edge to back edge on a roof.

10. A photovoltaic panel assembly for installation on a deck with like photovoltaic panel assemblies to form a photovoltaic array for converting sunlight to electrical energy, the photovoltaic panel assembly comprising:

a solar panel having a peripheral frame surrounding a solar collector that produces DC voltage when exposed to sunlight, the solar panel having left and right ends and front and back edges;

a left end coupler extending along the left end of the solar panel;

a right end coupler extending along the right end of the solar panel;

at least one front edge coupler secured at the front edge of the solar panel;

at least one back edge coupler secured at the back edge of the solar panel;

the left and right end couplers being configured to lock into sealing engagement when the ends of two like panels are urged together in an end-to-end relationship;

the at least one front edge coupler and the at least one back edge coupler being configured to lock into engagement when the bottom edge of the photovoltaic panel assembly is urged toward the top edge of a like photovoltaic panel assembly; and electrical wiring beneath the photovoltaic panel assembly for coupling the electrical energy produced by the panel assembly with electrical energy produced by like panel assemblies in an array;

one of the left and right end couplers comprising a ramp and the other one of the left and right couplers comprising a ramp follower, the ramp and ramp follower being configured to engage one another as the ends of two like photovoltaic panel assemblies are urged together to elevate the end coupler of one of the photovoltaic panel assemblies and then to allow the elevated end coupler to drop onto the end coupler of the other one of the photovoltaic panel assemblies.

11. The photovoltaic panel assembly of claim 10 further comprising at least one gasket on one of the end couplers, the gasket being positioned to be compressed between the end couplers when the elevated end of the one photovoltaic panel assembly drops onto the end coupler of the other one of the photovoltaic panels.

12. A photovoltaic panel assembly for installation on a deck with like photovoltaic panel assemblies to form a photovoltaic array for converting sunlight to electrical energy, the photovoltaic panel assembly comprising:

a solar panel having a peripheral frame surrounding a solar collector that produces DC voltage when exposed to sunlight, the solar panel having left and right ends and front and back edges;

a left end coupler extending along the left end of the solar panel;

a right end coupler extending along the right end of the solar panel;

at least one front edge coupler secured at the front edge of the solar panel;

at least one back edge coupler secured at the back edge of the solar panel;

the left and right end couplers being configured to lock into sealing engagement when the ends of two like panels are urged together in an end-to-end relationship;

the at least one front edge coupler and the at least one back edge coupler being configured to lock into engagement when the bottom edge of the photovoltaic panel assembly is urged toward the top edge of a like photovoltaic panel assembly; and electrical wiring beneath the photovoltaic panel assembly for coupling the electrical energy produced by the panel assembly with electrical energy produced by like panel assemblies in an array;

one of the front edge coupler and the back edge coupler comprising a ramp and the other one of the front edge coupler and the back edge coupler comprising a ramp follower, the ramp and ramp follower being configured and positioned to engage one another as the front edge of the photovoltaic panel assembly is urged toward the back edge of a like photovoltaic panel assembly and then to allow the front edge of the photovoltaic panel assembly to drop onto the back edge of the like photovoltaic panel assembly in overlying relationship.

13. A photovoltaic panel assembly as claimed in claim 12 wherein the back edge coupler comprises the ramp and the front edge coupler comprises the ramp follower.

14. A photovoltaic panel assembly as claimed in claim 13 wherein the ramp follower comprises a downwardly projecting tongue.

15. A photovoltaic panel assembly as claimed in claim 14 wherein the front edge and back edge couplers define a cable race for the routing of the electrical wiring between like panel assemblies of the array.

16. A photovoltaic panel assembly as claimed in claim 14 wherein one of the front edge and back edge couplers defines a ground channel configured to receive a ground wire for electrically grounding the photovoltaic panel assembly.

* * * * *